(12) United States Patent
Shih et al.

(10) Patent No.: US 8,339,715 B2
(45) Date of Patent: Dec. 25, 2012

(54) THREE-PIECE OPTICAL PICKUP LENS

(75) Inventors: Bo-Yuan Shih, Taipei (TW); San-Woei Shyu, Taipei (TW)

(73) Assignee: E-Pin Optical Industry Co., Ltd., Taipei (TW)

( * ) Notice: Subject to any disclaimer, the term of this patent is extended or adjusted under 35 U.S.C. 154(b) by 61 days.

(21) Appl. No.: 13/018,977

(22) Filed: Feb. 1, 2011

(65) Prior Publication Data

US 2012/0002303 A1 Jan. 5, 2012

(30) Foreign Application Priority Data

Jun. 30, 2010 (TW) .............................. 99121669 A

(51) Int. Cl.
*G02B 13/18* (2006.01)
*G02B 3/02* (2006.01)
*G02B 9/14* (2006.01)

(52) U.S. Cl. ...................................... 359/716; 359/785
(58) Field of Classification Search .................. 359/716, 359/784, 785, 792
See application file for complete search history.

(56) References Cited

U.S. PATENT DOCUMENTS

| | | | |
|---|---|---|---|
| 6,515,809 B2 | 2/2003 | Kohno | |
| 7,262,925 B2 | 8/2007 | Huang | |
| 7,423,817 B2 | 9/2008 | Nakanishi | |
| 7,450,323 B2 | 11/2008 | Nakamura | |
| 7,460,314 B2 | 12/2008 | Shyu et al. | |
| 7,460,315 B1 | 12/2008 | Cheng et al. | |
| 7,468,847 B2 | 12/2008 | Tang | |
| 7,486,328 B2 | 2/2009 | Sato et al. | |
| 7,511,899 B2 | 3/2009 | Isono | |
| 7,515,358 B2 | 4/2009 | Noda | |
| 2005/0128334 A1 | 6/2005 | Do | |
| 2007/0091457 A1 | 4/2007 | Asami | |
| 2007/0195426 A1 | 8/2007 | Kubota et al. | |
| 2007/0195432 A1 | 8/2007 | Nakamura | |
| 2007/0217034 A1 | 9/2007 | Taniyama | |
| 2007/0229986 A1 | 10/2007 | Sato et al. | |
| 2007/0229987 A1 | 10/2007 | Shinohara | |
| 2008/0225401 A1 | 9/2008 | Liao | |
| 2008/0239510 A1 | 10/2008 | Sato et al. | |
| 2008/0266679 A1 | 10/2008 | Nio | |
| 2009/0201593 A1* | 8/2009 | Isono | 359/716 |
| 2010/0118417 A1* | 5/2010 | Chen et al. | 359/716 |
| 2011/0279910 A1* | 11/2011 | Tang et al. | 359/716 |

FOREIGN PATENT DOCUMENTS

CN 1670560 9/2005
(Continued)

*Primary Examiner* — Darryl J Collins
(74) *Attorney, Agent, or Firm* — WPAT, P.C.; Anthony King

(57) ABSTRACT

A three-piece optical pickup lens includes, sequentially from an object side to an image side of the three-piece optical pickup lens along an optical axis thereof, an aperture stop, a first lens, a second lens, and a third lens. The first lens is a meniscus lens of positive refractive power. The second lens has an object side and an image side, on each of which at least one inflection point is formed at a position located between a center and a periphery of the second lens. The third lens has an object side and an image side, on each of which at least one inflection point is formed at a position located between a center and a periphery of the third lens, and has positive refractive power at paraxial region of optical axis.

11 Claims, 17 Drawing Sheets

FOREIGN PATENT DOCUMENTS

| | | |
|---|---|---|
| CN | 1873460 | 12/2006 |
| CN | 1945372 | 4/2007 |
| EP | 1830210 | 9/2007 |
| EP | 1840618 | 10/2007 |
| EP | 1942363 | 7/2008 |
| JP | 2004163786 | 6/2004 |
| JP | 3717488 | 11/2005 |
| JP | 2005338234 | 12/2005 |
| JP | 2005352317 | 12/2005 |
| JP | 2006098976 | 4/2006 |
| JP | 2006178328 | 7/2006 |
| JP | 3816093 | 8/2006 |
| JP | 2007010773 | 1/2007 |
| JP | 2007047513 | 2/2007 |
| JP | 2007094113 | 4/2007 |
| JP | 2007121820 | 5/2007 |
| JP | 2008139853 | 6/2008 |
| JP | 2008233222 | 10/2008 |
| JP | 2008276200 | 11/2008 |
| TW | 200639432 | 11/2006 |
| WO | 2007039980 | 4/2007 |

\* cited by examiner

THREE-PIECE OPTICAL PICKUP LENS

FIELD OF THE INVENTION

The present invention relates to a three-piece optical pickup lens, and more particularly to an optical pickup lens designed for use with a mobile phone or an image sensing device that uses a charge-coupled device (CCD) or a complementary metal-oxide-semiconductor (CMOS).

BACKGROUND OF THE INVENTION

Following the progress in different technological fields, various kinds of compact electronic products with multiple functions have been developed. Digital still cameras, personal computer (PC) cameras, web cameras and mobile phones all are electronic products equipped with an optical pickup device or lens. Recently, even the personal digital assistants (PDAs) are equipped with an optical pickup device or lens in response to the consumers' demands. For these electronic products to be convenient for carrying and meet the requirement for humanization, the optical pickup device for these electronic products must not only provide good image quality, but also have relatively small volume and low manufacturing cost to enable increased applicability thereof. The above-mentioned requirements or conditions are particularly important when the optical pickup device is applied in mobile phones.

The conventional spherically polished glass lenses have been widely accepted by the field of optical devices because there is a wide choice of materials for them and they are advantageous in terms of chromatic aberration correction. However, when the spherically polished glass lenses are applied in cases that require a relatively small F number and a relatively large field angle, the problem of correction of spherical aberration and astigmatism still exists. To overcome the drawbacks in the above-mentioned conventional spherically polished glass lenses, there are optical pickup devices using aspheric plastic lenses or aspheric molded glass lenses to obtain better image quality. US Patent Publication No. 2007/0091457; U.S. Pat. No. 6,515,809; U.S. Pat. No. 7,262,925; US Patent Publication No. 2007/0195432; US Patent Publication No. 2005/0128334; and JP Patent Publication Nos. 2007-121820, 2005-352317, 2004-163786, 2007-094113, 2005-338234, 2007-047513, and 2006-098976 all disclose optical pickup lens structures including three pieces of lens elements. The differences between the above-mentioned patent disclosures or the technical features thereof are determined simply based on changes or combinations of the following factors: (1) the shapes of the three lens elements; for example, the first, second and third lens elements can all be meniscus-shaped, or the first and second lens elements are meniscus-shaped while the third lens element is planoconcave-shaped or planoconvex-shaped; and/or (2) the orientations of the convex/concave surfaces of the three lens elements; for example, the first, second and third lens elements may have their convex/concave surfaces arranged at the object side or the image side or in different combinations; and/or (3) the negative/positive refractive power of the three lens elements, such as in the case disclosed in JP Patent No. 3717488.

It can be known from the above-mentioned patent disclosures that the designs of the three-piece optical pickup lenses in the prior art are aimed at the forming of different changes in or combinations of lenses for the application in different optical purposes. Since these designs use lenses that have different shapes, combinations, functions or effects, they are considered as novel or inventive.

In recent years, optical pickup lenses to be applied in small-size cameras are required to have miniaturized size, short focal length, and good aberration adjustment ability. Among various miniaturized three-piece optical pickup lens designs, it is found a pickup lens including a first lens having positive refractive power, a second lens having negative refractive power, and an M-shaped third lens with an inflection point to enable gradually changing positive and negative refractive power is most ideal for achieving the requirement of miniaturization.

To enable different imaging manners, EP Patent No. 1830210; JP Patent Publication Nos. 2008-139853 and 2006-178328; U.S. Pat. Nos. 7,397,613; 7,486,328; 7,423,817; 7,468,847 and 7,515,358; US Patent Publication Nos. 2007/0195426; 2007/0217034; 2007/0229986 and 2008/0239510; TW Patent Publication No. 200639432; CN Patent Publication Nos. 1670560 and 1873460 disclose three-piece pickup lens including a first lens of positive refractive power, a second lens of negative refractive power and an M-shaped third lens of positive refractive power. On the other hand, EP Patent Nos. 1840618 and 1942363; U.S. Pat. Nos. 7,460,315; 7,460,314; 7,450,323 and 7,511,899; US Patent Publication Nos. 2007/0229987; 2008/0225401; 2008/0266679 and 2007/0195426; JP Patent No. 3816093; JP Patent Publication Nos. 2008-276200; 2008-233222 and 2007-010773; WIPO Patent WO2007039980; and CN Patent 1945372 disclose three-piece pickup lens including a first lens of positive refractive power, a second lens of negative refractive power, and an M-shaped third lens of negative refractive power.

In the application of optical pickup lenses, what are currently most needed by general users are the optical pickup lenses used with mini or low-profile devices, such as mobile phones, and the optical pickup lenses used with web cameras. These optical pickup lenses have a small lens diameter (i.e. a small effective lens radius), a short full lens length (i.e. a short overall lens length), a short distance between the image sensing device and the lens (i.e. a short back focal length), and good aberration correction. The means adopted by the prior art to solve these problems include the use of different lenses to constitute the optical pickup lens, the use of different lens shapes, or the use of different related optical parameters. However, to achieve the object of further miniaturizing (slimming) the optical pickup lens while simplifying the design and the manufacture thereof, the inventor of the present invention proposes an optical pickup lens that includes a second and a third lens both being an M-shaped lens, in order to effectively shorten the back focal length and widen the field of view of the optical pickup lens, allowing the same to be applied to mini and slim mobile phones or other optical systems.

SUMMARY OF THE INVENTION

A primary object of the present invention is to provide a three-piece optical pickup lens that includes, sequentially from an object side to an image side of the lens along an optical axis thereof, an aperture stop, a first lens, a second lens, a third lens. The first lens is a meniscus lens having positive refractive power. The second lens has an object side and an image side, on each of which at least one inflection point is formed at a position between a center and a periphery of the second lens, and can have positive or negative refractive power at paraxial region. The third lens has an object side and an image side, on each of which at least one inflection point is formed at a position between a center and a periphery of the third lens, and has positive refractive power at paraxial region.

The three-piece optical pickup lens according to the present invention further satisfies the conditions as defined by the following formulas (1) and (2):

$$0.29 \leq BFL/TL \leq 0.36 \quad (1)$$

$$59.0° \leq 2\omega \leq 72.0° \quad (2)$$

In the present invention, the second lens has negative refractive power at the center thereof, and the refractive power of the second lens gradually increases from the center toward the periphery of the second lens to become positive refractive power. Alternatively, the second lens has positive refractive power at the center thereof, and the refractive power of the second lens gradually decreases from the center toward the periphery of the second lens to become negative refractive power. In the case the second lens has negative refractive power that gradually changes, from the center toward the periphery of the second lens, into positive refractive power, the second lens satisfies the condition as defined by the following formula (3):

$$0.700 \leq H_{2-}/H_{2t} \leq 0.995 \quad (3)$$

In the case the second lens has positive refractive power that gradually changes, from the center toward the periphery of the second lens, into negative refractive power, the second lens satisfies the condition as defined by the following formula (4):

$$0.755 \leq H_{2+}/H_{2t} \leq 0.955 \quad (4)$$

In the present invention, the third lens satisfies the condition as defined by the following formula (5):

$$0.590 \leq H_{3+}/H_{3t} = 0.790 \quad (5)$$

In the present invention, the first lens, the second lens, and the third lens respectively have a focal length satisfying the conditions as defined by the following formulas (6) to (8):

$$1.21 \leq f_1/f \leq 1.66 \quad (6)$$

$$-2.40 \leq f_2/f \leq 6.34 \quad (7)$$

$$0.81 \leq f_3/f \leq 2.95 \quad (8)$$

where,

BFL is the back focal length of the three-piece optical pickup lens;

TL is the distance from the aperture stop to an object side of an image plane along the optical axis;

$2\omega$ is the maximum field of view of the three-piece optical pickup lens;

$H_{2-}$ is the length of a line extended normal to the optical axis between an interface point, at where the refractive power of the second lens changes from negative into positive, and an intersection of the line with the optical axis;

$H_{2+}$ is the length of a line extended normal to the optical axis between an interface point, at where the refractive power of the second lens changes from positive into negative, and an intersection of the line with the optical axis;

$H_{2t}$ is the length of a line extended normal to the optical axis between a maximum optically active point on the image side of the second lens and an intersection of the line with the optical axis;

$H_{3+}$ is the length of a line extended normal to the optical axis between the inflection point on the image side of the third lens and an intersection of the line with the optical axis;

$H_{3t}$ is the length of a line extended normal to the optical axis between a maximum optically active point on the image side of the third lens and an intersection of the line with the optical axis;

f is the effective focal length of the three-piece optical pickup lens;

$f_1$ is the effective focal length of the first lens;

$f_2$ is the effective focal length of the second lens; and $f_3$ is the effective focal length of the third lens.

With the above arrangements, the three-piece optical pickup lens of the present invention can effectively correct aberration, so that the optical pickup lens has high resolution and effectively shortened lens length, enabling the optical pickup lens to be miniaturized and have reduced manufacturing cost and good applicability.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The structure and technical features of the present invention will now be described with some preferred embodiments thereof and with reference to the accompanying drawings, so that the present invention can be best understood.

Figure 1:
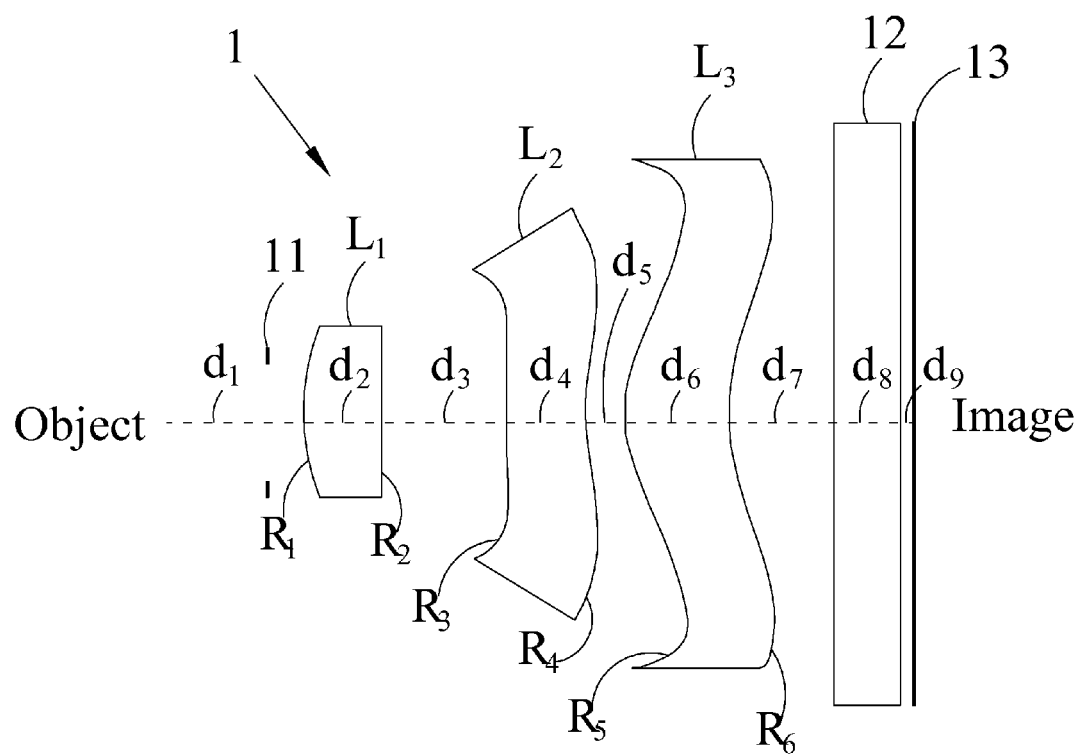
FIG. 1 is a schematic view showing an optical structure for a three-piece optical pickup lens according to the present invention.

Please refer to FIG. 1. The three-piece optical pickup lens 1 according to the present invention includes an aperture stop 11, a first lens $L_1$, a second lens $L_2$, a third lens $L_3$, an infrared cut-off filter (IR/CG) 12, and an image sensing chip 13 sequentially arranged along an optical axis Z from an object side toward an image side of the three-piece optical pickup lens 1. In the process of picking up an image, light from an object sequentially passes through the first lens $L_1$, the second lens $L_2$ and the third lens $L_3$, and further passes through the IR/CG 12 to form an image on the image plane where the image sensing chip 13 attached.

The aperture stop 11 is a front aperture stop being arranged in front of an object side $R_1$ of the first lens $L_1$.

The first lens $L_1$ is a meniscus lens of positive refractive power, and can be made of a glass material or a plastic material having a refractive index $(N_{d1})$ larger than 1.5 and an Abbe's number $(v_{d1})$ larger than 55. The object side $R_1$ of the first lens $L_1$ is a convex surface and an image side $R_2$ of the first lens $L_1$ is a concave surface. Further, at least one of the object side $R_1$ and the image side $R_2$ is an aspheric surface or both of them are an aspheric surface.

The second lens $L_2$ is an aspheric lens with an object side $R_3$ and an image side $R_4$ at the center of the lens being a convex surface and a concave surface, respectively, and the object side $R_3$ and the image side $R_4$ each including at least one inflection point. The second lens $L_2$ can be made of a glass material or a plastic material having a refractive index $N_{d2}$ larger than 1.6 and an Abbe's number $v_{d2}$ larger than 26. The refractive power of the object side $R_3$ and the image side $R_4$ of the second lens $L_2$ is negative at the center of the lens and changes to positive at the periphery of the lens after passing the inflection point. The second lens $L_2$ has a substantially M-shaped cross section extended from a center toward to two outer ends thereof, as can be seen from FIG. 2. That is, the object side $R_3$ and the image side $R_4$ of the second lens $L_2$ have curvatures that gradually change from the center toward the periphery of the lens, such that the convex/concave surfaces of the object side $R_3$ and the image side $R_4$ at paraxial region of optical axis Z evolve into concave/convex surfaces, respectively, at the periphery of the second lens $L_2$. Therefore, an inflection point is formed on each of the object side $R_3$ and the image side $R_4$.

Figure 2:
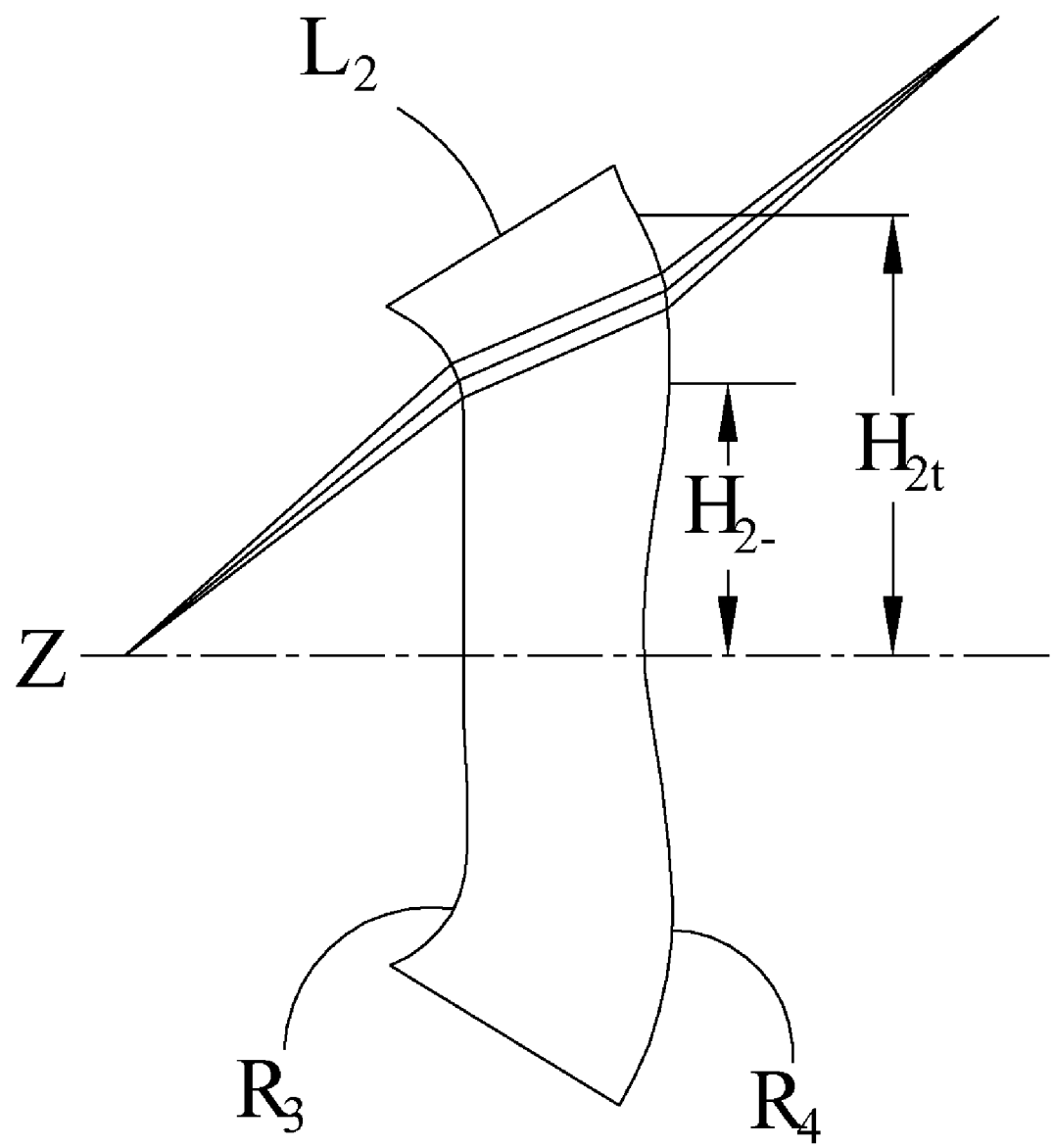
FIG. 2 is a schematic view showing the inflection point, the $H_{2-}$, and the $H_{2t}$ at the image side of the second lens shown in FIG. 1.

When a tangent line at the inflection point on the image side $R_4$ intersects with the optical axis Z at a right angle, a vertical distance between the inflection point on the image side $R_4$ and the optical axis Z represents a range of height for an equivalent negative refractive power of the second lens $L_2$, and this range of height is denoted as $H_{2-}$, as shown in FIG. 2. On the other hand, a vertical distance from a maximum optically active point on the image side $R_4$ of the second lens $L_2$, i.e., a maximum area of the second lens $L_2$ that permits light to pass through, to the optical axis Z is denoted as $H_{2t}$. A ratio of $H_{2-}$ to $H_{2t}$ represents the size of an area on the maximum optically active point having the equivalent negative refractive power. To obtain good imaging effect, the ratio of $H_{2-}$ to $H_{2t}$ is preferably ranged between 70% and 99.5%.

The third lens $L_3$ is an aspheric lens with an object side $R_5$ and an image side $R_6$ at the center of the lens being a convex surface and a concave surface, respectively, and having positive refractive power at paraxial region of optical axis Z; and the object side $R_5$ and the image side $R_6$ each including at least one inflection point. The third lens $L_3$ can be made of a glass material or a plastic material having a refractive index $N_{d3}$ larger than 1.5 and an Abbe's number $v_{d3}$ larger than 55. The refractive power of the object side $R_5$ and the image side $R_6$ of the third lens $L_3$ is positive at the center of the lens and gradually changes to negative at the periphery of the lens. The third lens $L_3$ has a substantially M-shaped cross section extended from a center toward to two outer ends thereof, as can be seen from FIG. 3. That is, the object side $R_5$ and the image side $R_6$ of the third lens $L_3$ have curvatures that gradually change from the center toward the periphery of the lens, such that the convex/concave surfaces of the object side $R_5$ and the image side $R_6$ at paraxial region of optical axis Z evolve into concave/convex surfaces, respectively, at the periphery of the third lens $L_3$. Therefore, an inflection point is formed on each of the object side $R_5$ and the image side $R_6$.

Figure 3:
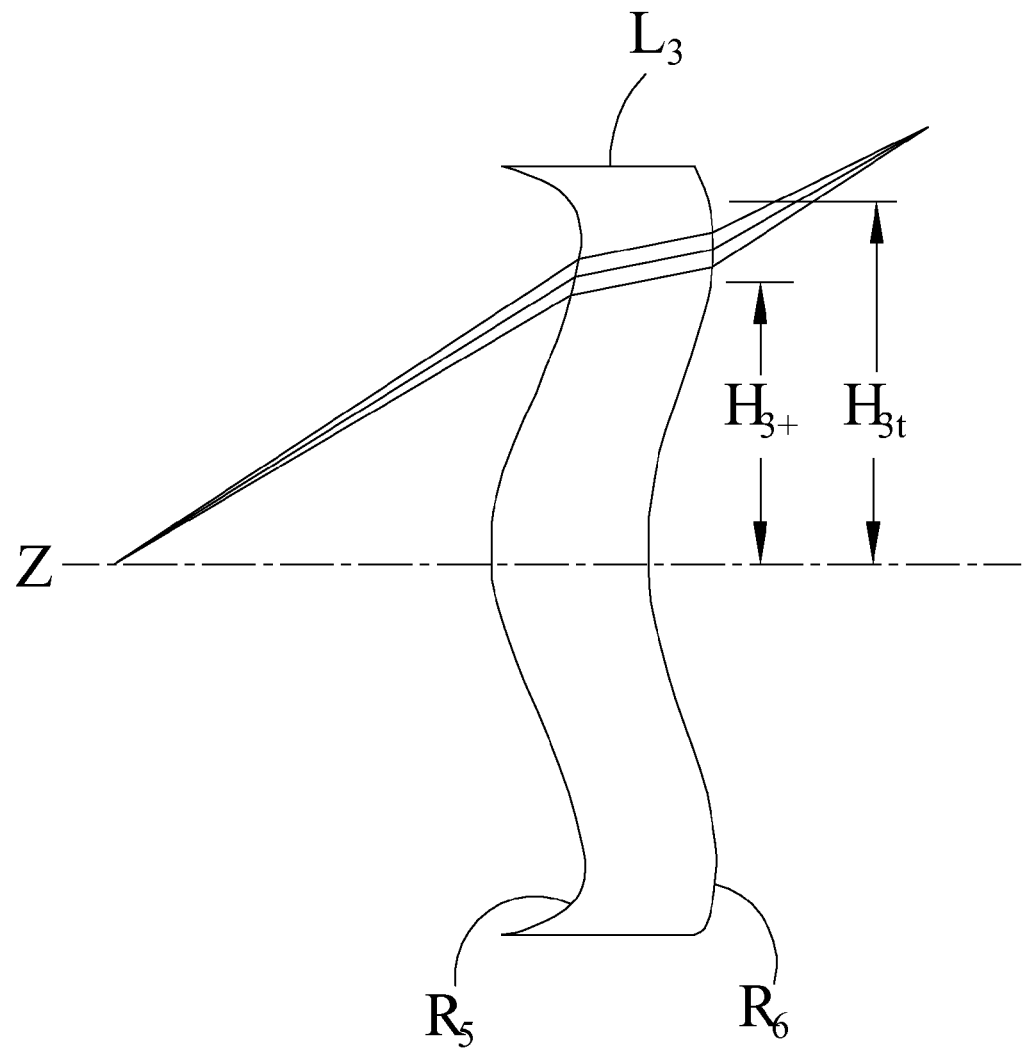
FIG. 3 is a schematic view showing the inflection point, the $H_{3-}$, and the $H_{3t}$ at the image side of the third lens shown in FIG. 1.

When a tangent line at the inflection point on the image side $R_6$ intersects with the optical axis Z at a right angle, a vertical distance between the inflection point on the image side $R_6$ and the optical axis Z represents a range of height for an equivalent positive refractive power of the third lens $L_3$, and this range of height is denoted as $H_{3+}$, as shown in FIG. 3. On the other hand, a vertical distance from a maximum optically active point on the image side $R_6$ of the third lens $L_3$, i.e., a maximum area of the third lens $L_3$ that permits light to pass through, to the optical axis Z is denoted as $H_{3t}$. A ratio of $H_{3+}$ to $H_{3t}$ represents the size of an area on the maximum optically active point having the equivalent positive refractive power. To obtain good imaging effect, the ratio of $H_{3+}$ to $H_{3t}$ is preferably ranged between 59% and 79%.

The IR/CG 12 can be a glass lens or a diaphragm being coated to provide the function of filtering infrared ray.

The image sensing chip 13 can be a charge-coupled device (CCD) or a complementary metal-oxide-semiconductor (CMOS).

The three-piece optical pickup lens 1 according to the present invention satisfies the conditions as defined by the following formulas (1) to (3) and (5) to (8):

$$0.29 \leq BFL/TL \leq 0.36 \tag{1}$$

$$59.0° \leq 2\omega \leq 72.0° \tag{2}$$

$$0.700 \leq H_{2-}/H_{2t} \leq 0.995 \tag{3}$$

$$0.590 \leq H_{3+}/H_{3t} \leq 0.790 \tag{5}$$

$$1.21 \leq f_1/f \leq 1.66 \tag{6}$$

$$-2.40 \leq f_2/f \leq 6.34 \tag{7}$$

$$0.81 \leq f_3/f \leq 2.95 \tag{8}$$

where,

BFL is the back focal length of the three-piece optical pickup lens 1;

TL is the distance from the aperture stop 11 to the object side of the image sensing chip 13 along the optical axis;

2ω is the maximum field of view of the three-piece optical pickup lens 1;

$H_{2-}$ is the length of a line extended normal to the optical axis Z between an interface point, at where the refractive power of the second lens $L_2$ changes from negative into positive, and an intersection of the line with the optical axis Z;

$H_{2t}$ is the length of a line extended normal to the optical axis Z between a maximum optically active point on the image side $R_4$ of the second lens $L_2$ and an intersection of the line with the optical axis Z;

$H_{3+}$ is the length of a line extended normal to the optical axis Z between the inflection point on the image side $R_6$ of the third lens $L_3$ and an intersection of the line with the optical axis Z;

$H_{3t}$ is the length of a line extended normal to the optical axis Z between a maximum optically active point on the image side $R_6$ of the third lens $L_3$ and an intersection of the line with the optical axis Z;

f is the effective focal length of the three-piece optical pickup lens 1;

$f_1$ is the effective focal length of the first lens $L_1$;

$f_2$ is the effective focal length of the second lens $L_2$; and $f_3$ is the effective focal length of the third lens $L_3$.

In the three-piece optical pickup lens 1 of the present invention, the refractive power of the second lens $L_2$ at the center and the periphery of the lens are not particularly limited to the aforesaid conditions. Please refer to FIG. 4. The refractive power of the object side $R_3$ and the image side $R_4$ of the second lens $L_2$ is positive at the center of the lens and gradually changes to negative at the periphery of the lens, and the second lens $L_2$ has a substantially M-shaped cross section extended from a center toward to two outer ends thereof. That is, the object side $R_3$ and the image side $R_4$ of the second lens $L_2$ have curvatures that gradually change from the center toward the periphery of the lens, such that the convex/concave surfaces of the object side $R_3$ and the image side $R_4$ at paraxial region of optical axis Z evolve into concave/convex surfaces, respectively, at the periphery of the second lens $L_2$, and an inflection point is formed at each transition from the positive refractive power to the negative refractive power.

Figure 5:
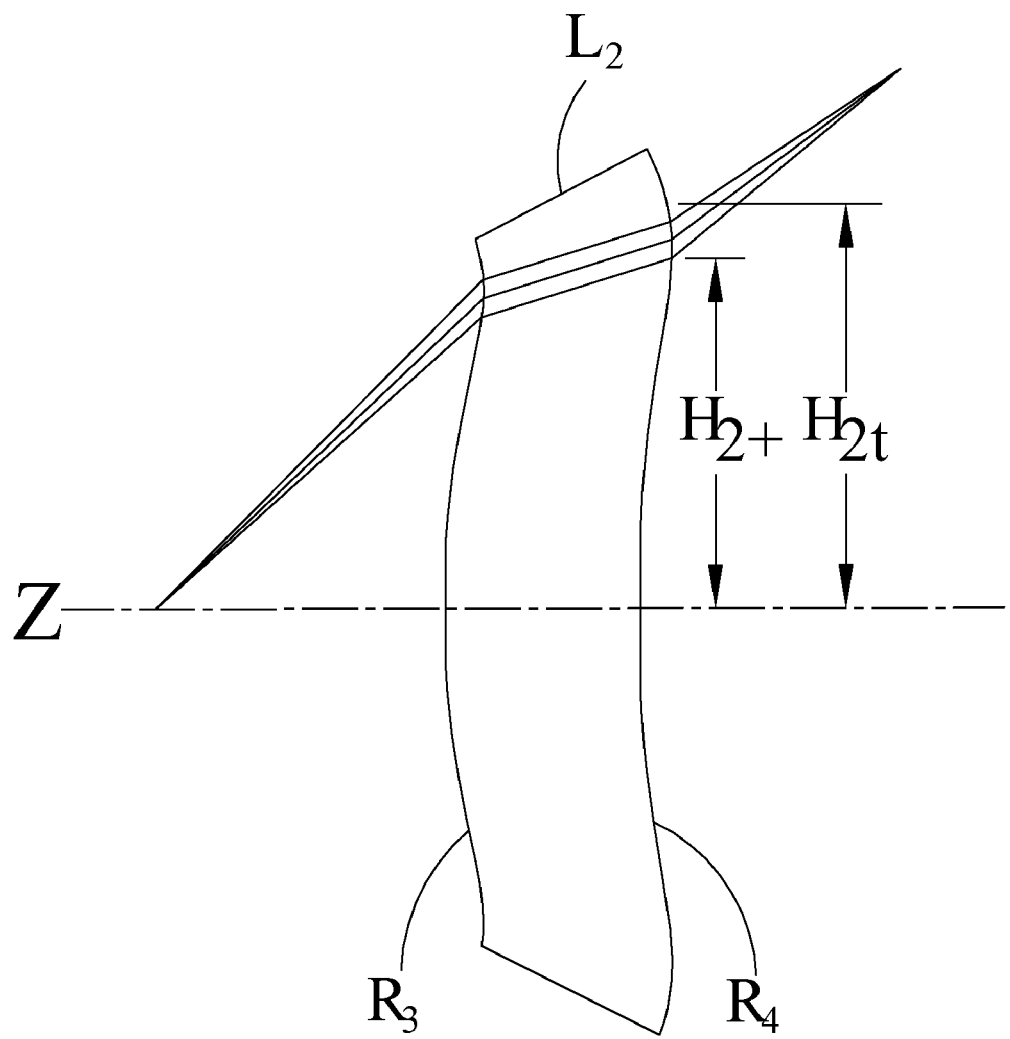
FIG. 5 is a schematic view showing the inflection point, the $H_{2+}$, and the $H_{2t}$ at the image side of the second lens shown in FIG. 4.

When a tangent line at the inflection point on the image side $R_4$ intersects with the optical axis Z at a right angle, a vertical distance between the inflection point on the image side $R_4$ and the optical axis Z represents a range of height for an equivalent positive refractive power of the second lens $L_2$, and this range of height is denoted as $H_{2+}$, as shown in FIG. 5. On the other hand, a vertical distance from a maximum optically active point on the image side $R_4$ of the second lens $L_2$, i.e., a maximum area of the second lens $L_2$ that permits light to pass through, to the optical axis Z is denoted as $H_{2t}$. A ratio of $H_{2+}$ to $H_{2t}$ represents the size of an area on the maximum optically active point having the equivalent positive refractive power. To obtain good imaging effect, the ratio of $H_{2+}$ to $H_{2t}$ is preferably ranged between 76% and 96%.

Thus, the three-piece optical pickup lens 1 according to the present invention satisfies the conditions as defined by the following formulas (1) to (2) and (4) to (8):

$$0.29 \leq BFL/TL \leq 0.36 \quad (1)$$

$$59.0° \leq 2\omega \leq 72.0° \quad (2)$$

$$0.755 \leq H_{2+}/H_{2t} \leq 0.955 \quad (4)$$

$$0.590 \leq H_{3+}/H_{3t} \leq 0.790 \quad (5)$$

$$1.21 \leq f_1/f \leq 1.66 \quad (6)$$

$$-2.40 \leq f_2/f \leq 6.34 \quad (7)$$

$$0.81 f_3/f \leq 2.95 \quad (8)$$

where, $H_{2+}$ is the length of a line extended normal to the optical axis Z between an interface point, at where the refractive power of the second lens $L_2$ changes from positive into negative, and an intersection of the line with the optical axis Z; and all other parameters in the above formulas have definitions the same as those having been mentioned above.

To achieve the objects of the present invention, it is preferably the optical surfaces of the first lens $L_1$, the second lens $L_2$, and the third lens $L_3$ are aspheric surfaces. However, the first lens $L_1$ is not particularly restricted to this condition and can also be designed to have a spherical surface. And, the aspheric surface formula thereof is the following equation (9):

$$Z = \frac{ch^2}{1+\sqrt{(1-(1+K)c^2h^2)}} + A_4h^4 + A_6h^6 + A_8h^8 + A_{10}h^{10} + A_{12}h^{12} + A_{14}h^{14} \quad (9)$$

where, Z is the distance (SAG) from any point on any of the lens to the zero point tangential plane of the lens in the direction of the optical axis; c is the curvature; h is the lens height; K is the conic constant, and $A_4 \sim A_{14}$ are the $4^{th} \sim 14^{th}$ order aspheric coefficients.

The above structure effectively enables the three-piece optical pickup lens 1 of the present invention to have effectively reduced back focal length and widened field of view, allowing the three-piece optical pickup lens 1 of the present invention to have miniaturized size and lowered manufacturing cost.

The present invention will now be described with some preferred embodiments as below:

<First Embodiment>

Figure 6:
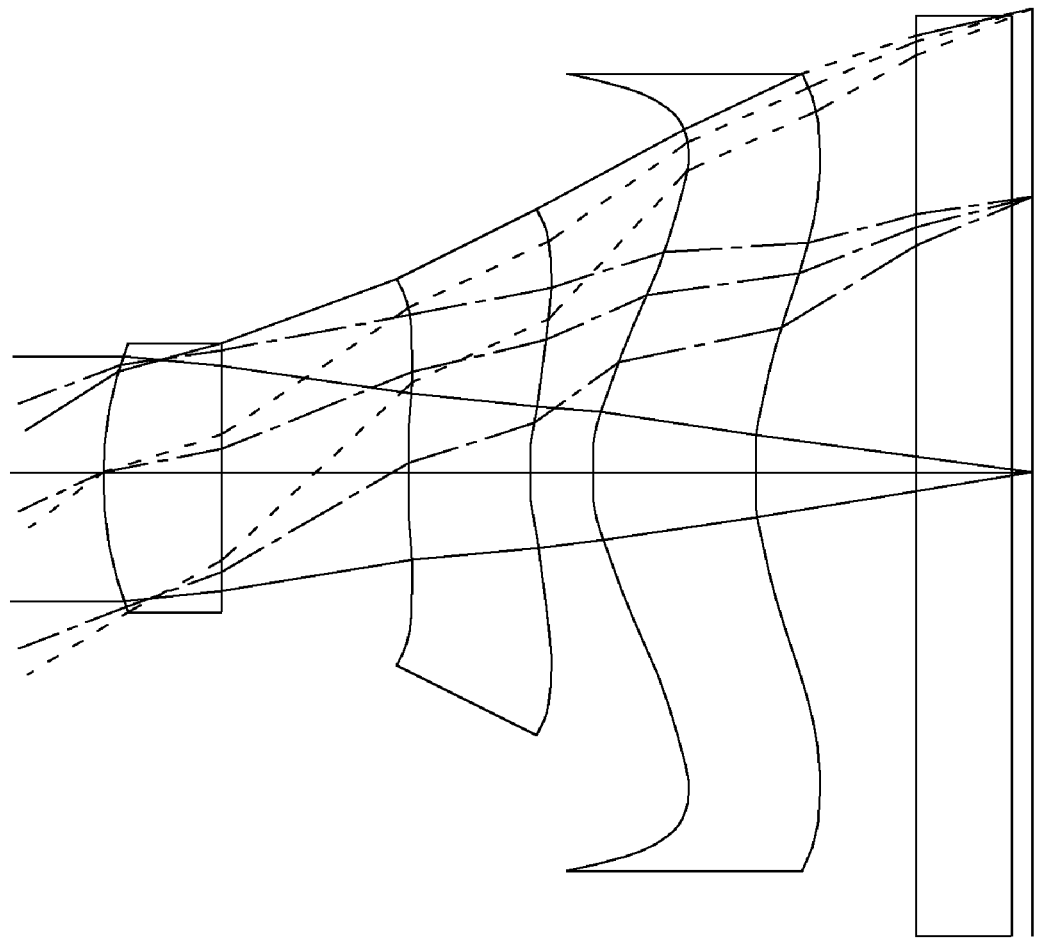
FIG. 6 is a schematic view showing the optical path structure of the three-piece optical pickup lens of the present invention according to a first embodiment thereof.
Figure 7:
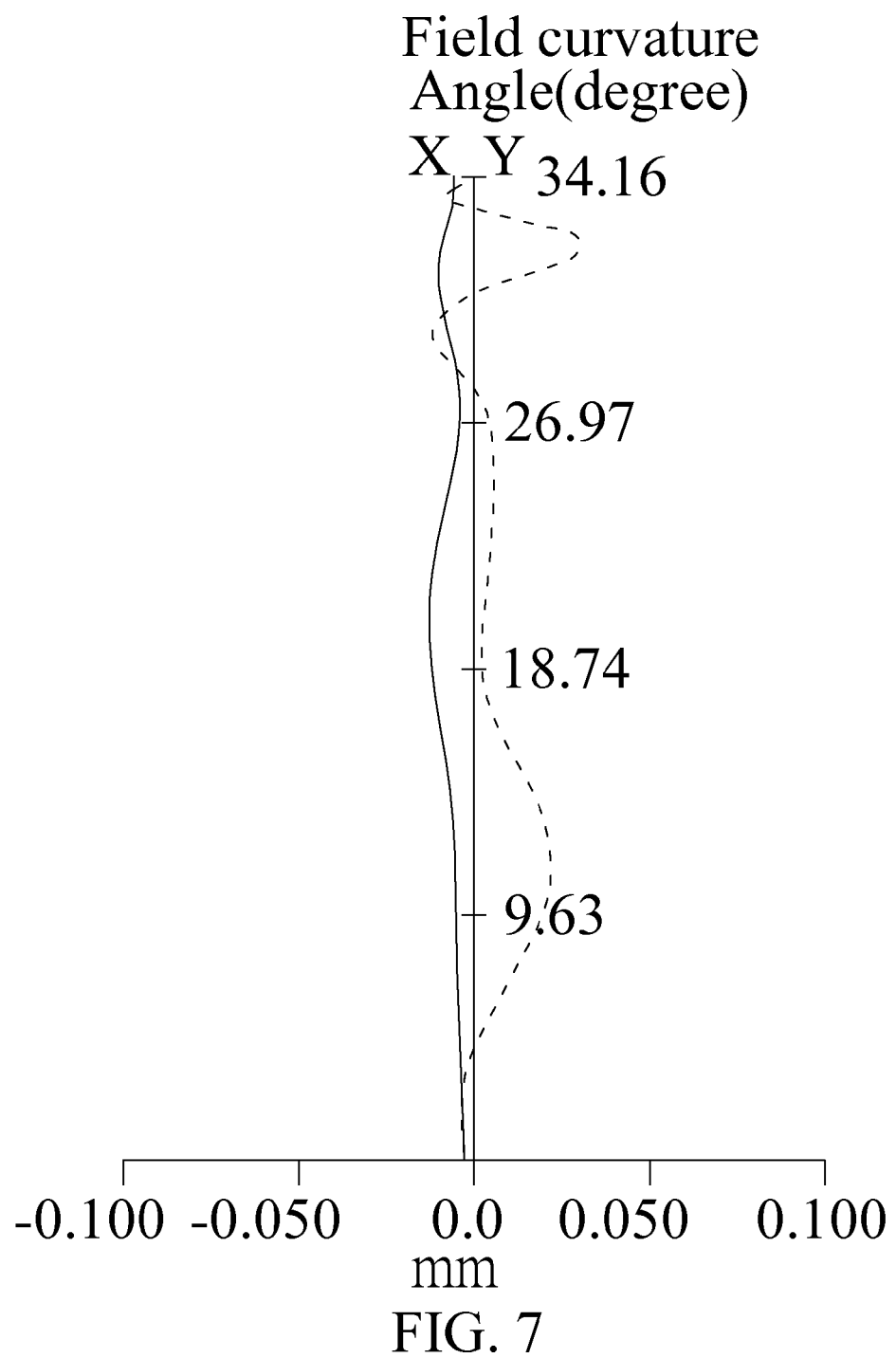
FIG. 7 is a field curvature diagram of the three-piece optical pickup lens of the present invention according to the first embodiment thereof.
Figure 8:
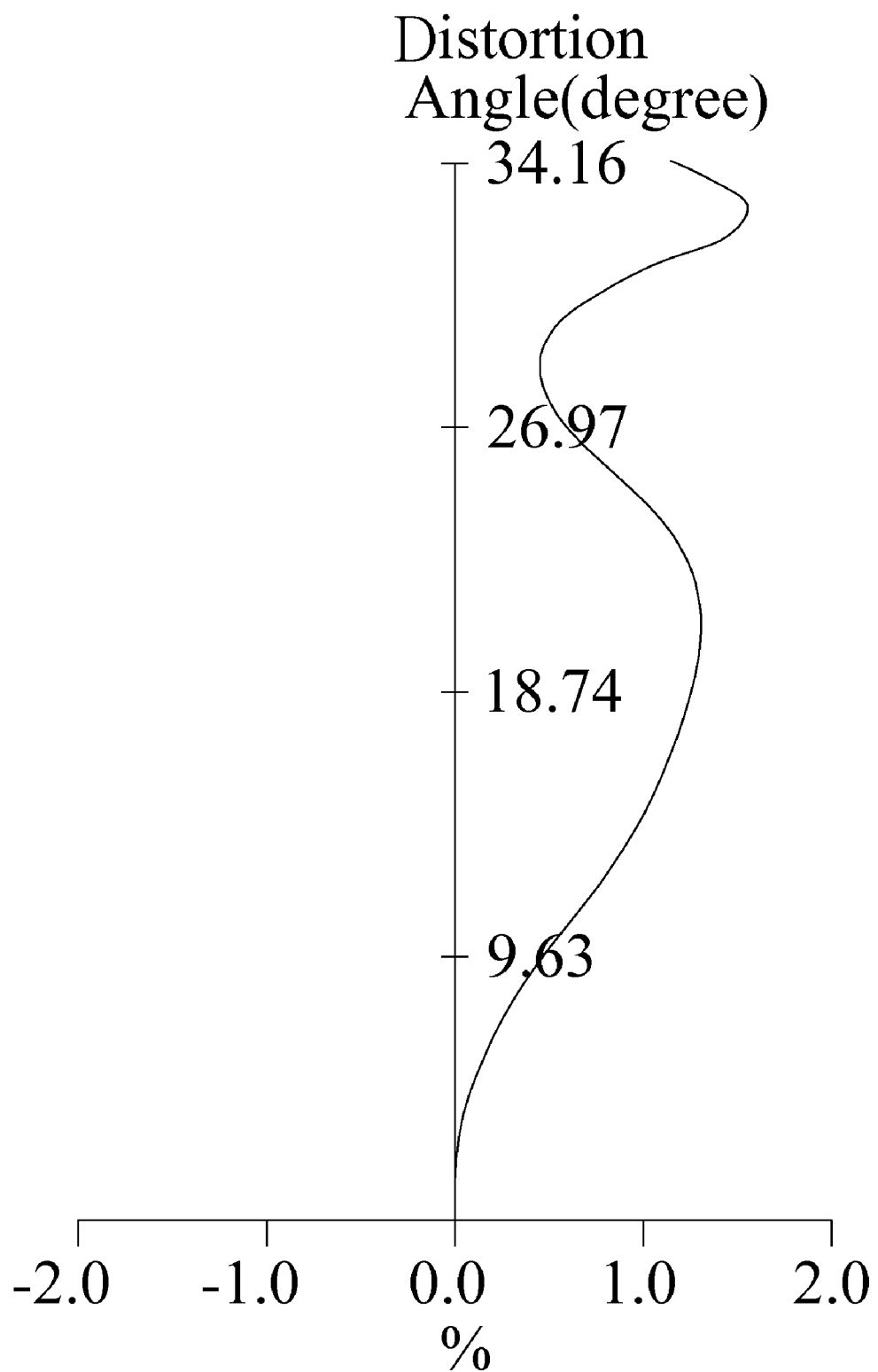
FIG. 8 is a distortion diagram of the three-piece optical pickup lens of the present invention according to the first embodiment thereof.

FIG. 6 is a schematic view showing the optical path structure of the three-piece optical pickup lens 1 according to a first embodiment of the present invention; FIG. 7 is a field curvature diagram of the three-piece optical pickup lens 1 in the first embodiment; and FIG. 8 is a distortion diagram of the three-piece optical pickup lens 1 in the first embodiment.

In the Table (1) listed below, there are shown sequentially numbered optical surfaces from the object side to the image side of the optical pickup lens 1; the radius of curvature R of each of these optical surfaces on the optical axis Z in mm; the on-axis surface spacing d between the adjacent optical surfaces on the optical axis Z; the refractive index $N_d$ of each of the lenses; the Abbe's number $v_d$ of each the lenses; and the effective focal length f, the maximum field of view FOV (2ω in degree), and the f number $F_{no}$ of the three-piece optical pickup lens 1.

TABLE 1

Fno = 2.8 f = 2.2000 FOV = 66.0

| Optical surface | Radius of curvature R | Spacing d (mm) | Refractive index $N_d$ | Abbe's number $v_d$ |
|---|---|---|---|---|
| 1 Object (OBJ) | ∞ | | | |
| STOP | | 0.0000 | | |
| 2 $R_1$* | 1.1944 | 0.3645 | 1.53 | 55.93 |
| 3 $R_2$* | 6.3420 | 0.5852 | | |
| 4 $R_3$* | 3.2940 | 0.3779 | 1.61 | 26.00 |
| 5 $R_4$* | 1.0587 | 0.1883 | | |
| 6 $R_5$* | 0.6460 | 0.4954 | 1.53 | 55.93 |
| 7 $R_6$* | 1.2187 | 0.5000 | | |
| 8 IR/CG | ∞ | 0.3000 | | |
| 9 | | 0.0588 | | |
| 10 Image (IMA) | ∞ | | | |

*Aspheric surface

In the Table (2) listed below, there are shown the coefficients for the aspheric surface formula (9) of the optical surfaces in the first embodiment:

TABLE 2

| Optical surface | k | A4 | A6 | A8 | A10 | A12 |
|---|---|---|---|---|---|---|
| $R_1$* | −2.0176E+00 | 3.0884E−02 | −2.9459E−01 | 2.7377E−01 | −3.5834E+00 | −3.7875E+00 |
| $R_2$* | −1.1707E+02 | −1.6864E−01 | −4.1977E−01 | −1.7119E−01 | −6.4148E+00 | 1.3379E+01 |
| $R_3$* | −2.2039E+02 | −1.7962E−01 | −3.3189E−01 | −6.0945E−01 | 1.3583E−01 | 1.9148E+00 |
| $R_4$* | −2.3679E+01 | −2.7251E−01 | 2.1782E−01 | −7.4722E−02 | −2.5035E−01 | −1.6020E−01 |
| $R_5$* | −4.8748E+00 | 9.1025E−02 | −3.1328E−01 | 9.0822E−02 | 9.4773E−02 | 2.2176E−03 |
| $R_6$* | −2.0678E+00 | −6.0405E−02 | −1.3697E−01 | 1.9827E−02 | 3.2187E−02 | 8.2547E−03 |

Please refer to FIGS. 6 to 8 along with FIGS. 1 to 3. In the first embodiment, the first lens $L_1$ is made of a plastic material having a refractive index $N_{d1}$ of 1.53 and an Abbe's number $v_{d1}$ of 55.93; the second lens $L_2$ is made of a plastic material having a refractive index $N_{d2}$ of 1.61 and an Abbe's number $v_{d2}$ of 26; the third lens $L_3$ is made of a plastic material having a refractive index $N_{d3}$ of 1.53 and an Abbe's number $v_{d3}$ of 55.93; and the IR/CG 12 is made of a BK7 glass material.

In the first embodiment of the three-piece optical pickup lens 1, the effective focal length f is 2.2000 mm, the back focal length BFL is 0.8588 mm, and the TL is 2.8702 mm. The focal length $f_1$ of the first lens $L_1$ is 2.7226 mm, the focal length $f_2$ of the second lens $L_2$ is −2.6901 mm, and the focal length $f_3$ of the third lens $L_3$ is 2.0062 mm. The $H_{2−}$ and the $H_{2t}$ of the image side $R_4$ of the second lens $L_2$ are 1.25 mm and 1.73 mm, respectively. The $H_{3+}$ and the $H_{3t}$ of the image side $R_6$ of the third lens $L_3$ are 2.00 mm and 2.62 mm, respectively.

After calculation, the values of the formulas (1)~(3) and (5)~(8) obtained from the first embodiment of the three-piece optical pickup lens 1 are shown in the following Table (3). As can be seen from Table (3), the three-piece optical pickup lens 1 in the first embodiment thereof satisfies the conditions defined by the formulas (1)~(3) and (5)~(8).

TABLE 3

| BFL/TL | 0.2992 |
|---|---|
| 2ω | 66.0 |
| $H_{2−}/H_{2t}$ | 0.722 |
| $H_{3+}/H_{3t}$ | 0.763 |
| $f_1/f$ | 1.2375 |

TABLE 3-continued

| $f_2/f$ | −1.2228 |
|---|---|
| $f_3/f$ | 0.9119 |

<Second Embodiment>

Figure 9:
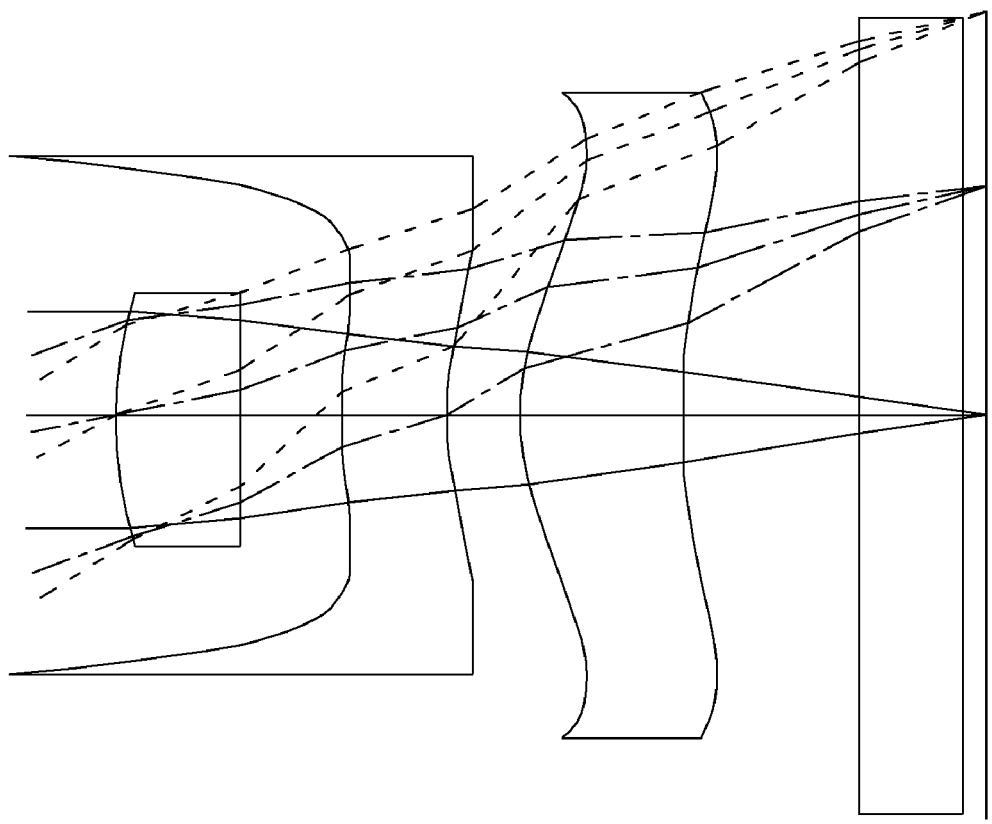
FIG. 9 is a schematic view showing the optical path structure of the three-piece optical pickup lens of the present invention according to a second embodiment thereof.
Figure 10:
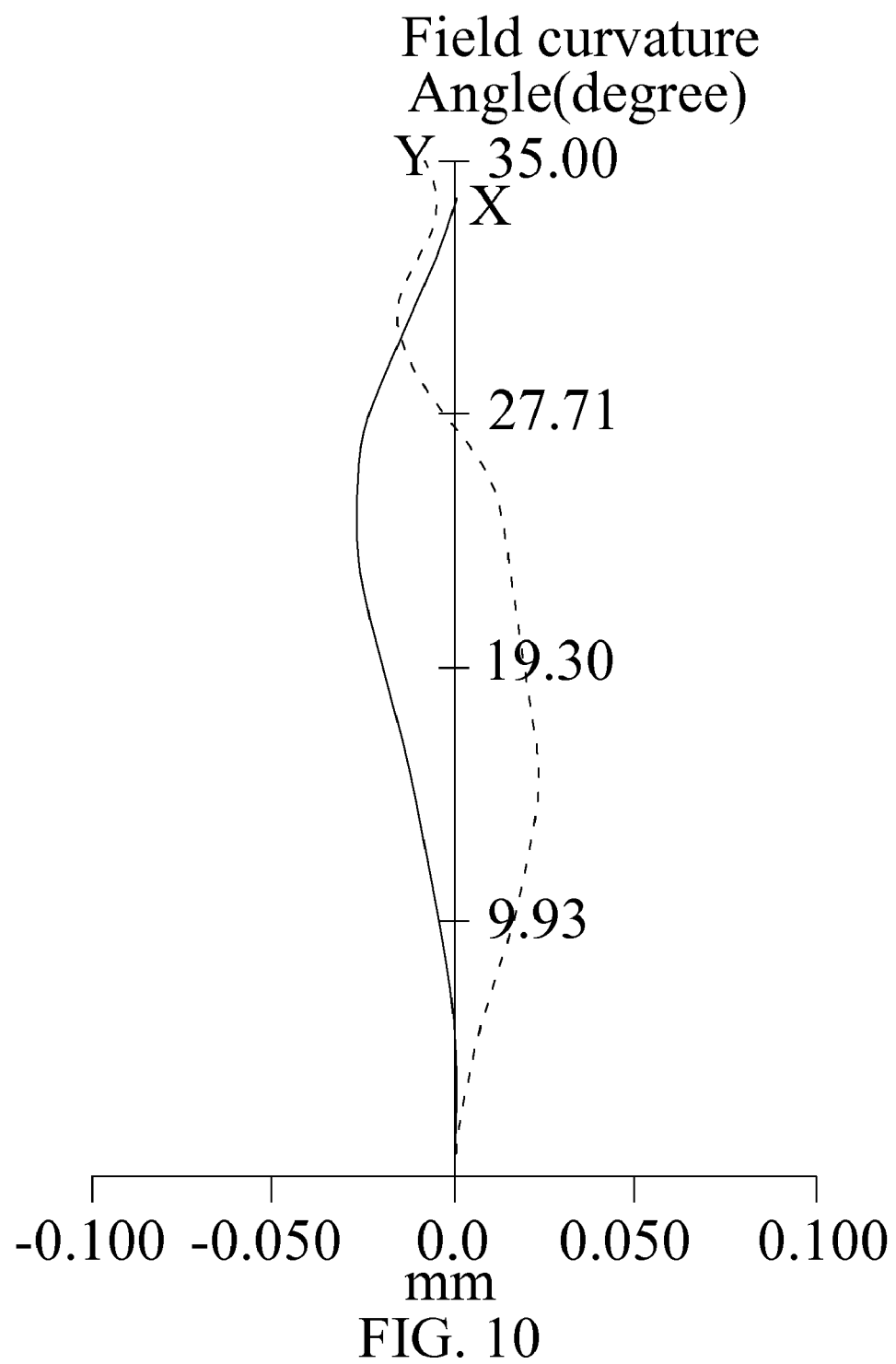
FIG. 10 is a field curvature diagram of the three-piece optical pickup lens of the present invention according to the second embodiment thereof.
Figure 11:
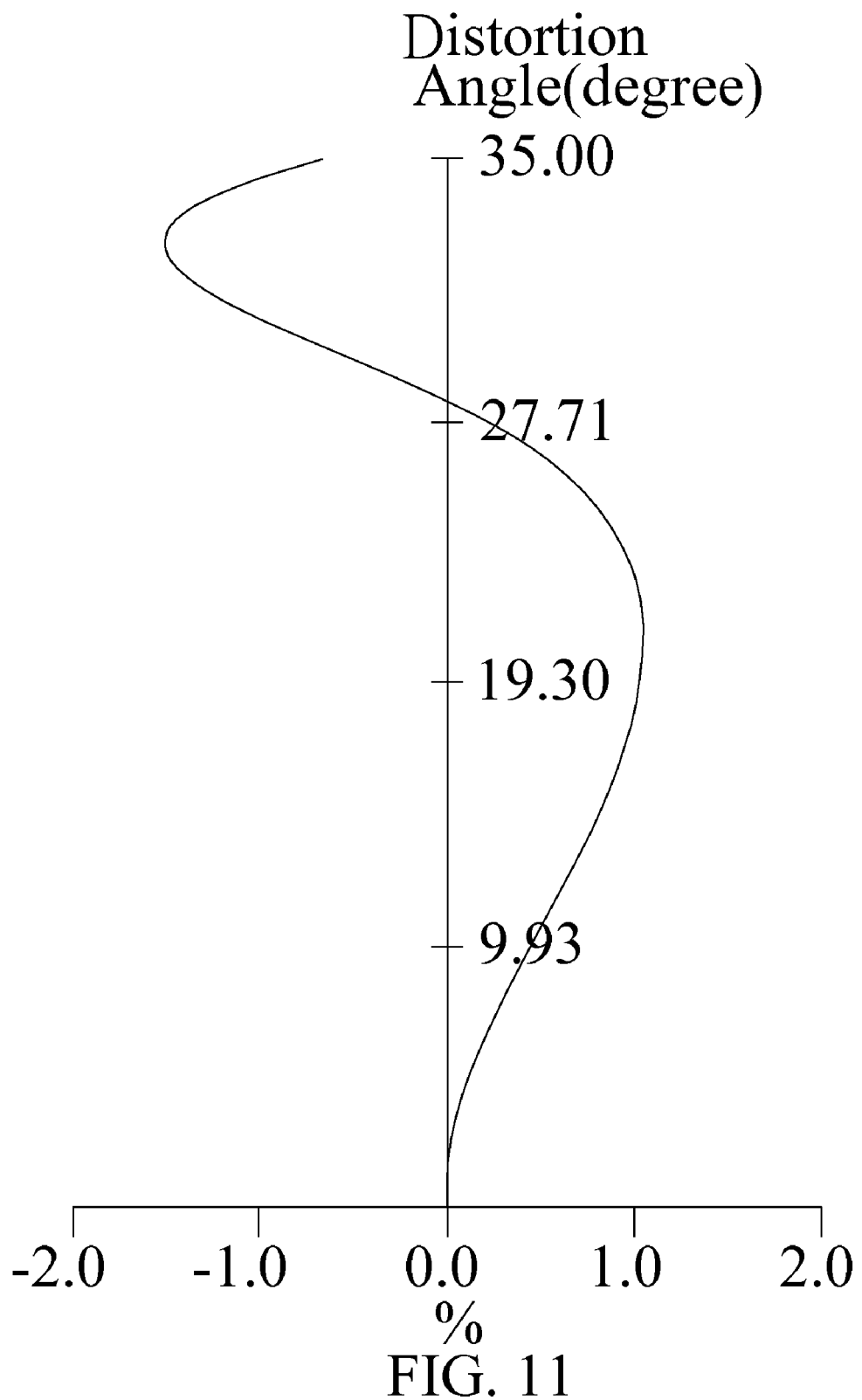
FIG. 11 is a distortion diagram of the three-piece optical pickup lens of the present invention according to the second embodiment thereof.

FIG. 9 is a schematic view showing the optical path structure of the three-piece optical pickup lens 1 according to a second embodiment of the present invention; FIG. 10 is a field curvature diagram of the three-piece optical pickup lens 1 in the second embodiment; and FIG. 11 is a distortion diagram of the three-piece optical pickup lens 1 in the second embodiment.

In the Table (4) listed below, there are shown sequentially numbered optical surfaces from the object side to the image side of the optical pickup lens 1; the radius of curvature R of each of these optical surfaces on the optical axis Z in mm; the on-axis surface spacing d between the adjacent optical surfaces on the optical axis Z; the refractive index $N_d$ of each of the lenses; the Abbe's number $v_d$ of each the lenses; and the effective focal length f, the maximum field of view FOV (2ω in degree), and the f number $F_{no}$ of the three-piece optical pickup lens 1.

TABLE 4

Fno = 2.8 f = 1.8022 FOV = 70.0

| Optical surface | Radius of curvature R | Spacing d (mm) | Refractive index $N_d$ | Abbe's number $v_d$ |
|---|---|---|---|---|
| 1 Object (OBJ) | ∞ | | | |
| STOP | | 0.0000 | | |
| 2 $R_1$* | 1.1057 | 0.3506 | 1.53 | 55.93 |
| 3 $R_2$* | 3.8583 | 0.3000 | | |
| 4 $R_3$* | 1.5718 | 0.3000 | 1.61 | 26.00 |
| 5 $R_4$* | 0.9383 | 0.2042 | | |
| 6 $R_5$* | 0.7541 | 0.4579 | 1.53 | 55.93 |
| 7 $R_6$* | 2.1414 | 0.5000 | | |
| 8 IR/CG | ∞ | 0.3000 | | |
| 9 | | 0.0588 | | |
| 10 Image (IMA) | ∞ | | | |

*Aspheric surface

In the Table (5) listed below, there are shown the coefficients for the aspheric surface formula (9) of the optical surfaces in the second embodiment:

TABLE 5

| Optical surface | k | A4 | A6 | A8 | A10 | A12 |
|---|---|---|---|---|---|---|
| $R_1$* | −2.7793E+00 | 1.2385E−02 | −2.9386E−01 | −5.9951E+00 | 1.3672E+01 | −1.0842E+01 |
| $R_2$* | −2.2154E+02 | −2.5974E−01 | −1.8818E+00 | −2.5200E+00 | −4.5176E+00 | 1.4534E+00 |
| $R_3$* | −3.1509E+01 | −3.4076E−01 | −2.3441E−01 | −2.0468E+00 | −7.8454E+00 | −1.6920E+01 |
| $R_4$* | −1.6111E+01 | −1.7648E−01 | 5.1537E−02 | −4.1975E−01 | −7.6572E−01 | 2.1768E−02 |
| $R_5$* | −6.2216E+00 | 1.7147E−01 | −4.7404E−01 | −5.7235E−02 | 2.0361E−01 | 8.9524E−02 |
| $R_6$* | −2.8960E−01 | 9.0168E−02 | −3.8245E−01 | −6.1736E−02 | 1.1266E−01 | 6.8244E−02 |

Please refer to FIGS. 9 to 11 along with FIGS. 1 to 3. In the second embodiment, the first lens $L_1$ is made of a plastic material having a refractive index $N_{d1}$ of 1.53 and an Abbe's number $v_{d1}$ of 55.93; the second lens $L_2$ is made of a plastic material having a refractive index $N_{d2}$ of 1.61 and an Abbe's number $v_{d2}$ of 26; the third lens $L_3$ is made of a plastic material having a refractive index $N_{d3}$ of 1.53 and an Abbe's number $v_{d3}$ of 55.93; and the IR/CG 12 is made of a BK7 glass material.

In the second embodiment of the three-piece optical pickup lens 1, the effective focal length f is 1.8022 mm, the back focal length BFL, is 0.8588 mm, and the TL is 2.4716 mm The focal length $f_1$ of the first lens $L_1$ is 2.8139 mm, the focal length $f_2$ of the second lens $L_2$ is −4.5854 mm, and the focal length $f_3$ of the third lens $L_3$ is 1.9807 mm The $H_{2−}$ and the $H_{2t}$ of the image side $R_4$ of the second lens $L_2$ are 1.25 mm and 1.26 mm, respectively. The $H_{3+}$ and the $H_{3t}$ of the image side $R_6$ of the third lens $L_3$ are 1.50 mm and 1.93 mm, respectively.

After calculation, the values of the formulas (1)~(3) and (5)~(8) obtained from the second embodiment of the three-piece optical pickup lens 1 are shown in the following Table (6). As can be seen from Table (6), the three-piece optical pickup lens 1 in the second embodiment thereof satisfies the conditions defined by the formulas (1)~(3) and (5)~(8).

TABLE 6

| | |
|---|---|
| BFL/TL | 0.3475 |
| 2ω | 70.0 |
| $H_{2−}/H_{2t}$ | 0.991 |
| $H_{3+}/H_{3t}$ | 0.777 |
| $f_1/f$ | 1.5613 |
| $f_2/f$ | −2.5443 |
| $f_3/f$ | 1.0990 |

<Third Embodiment>

Figure 12:
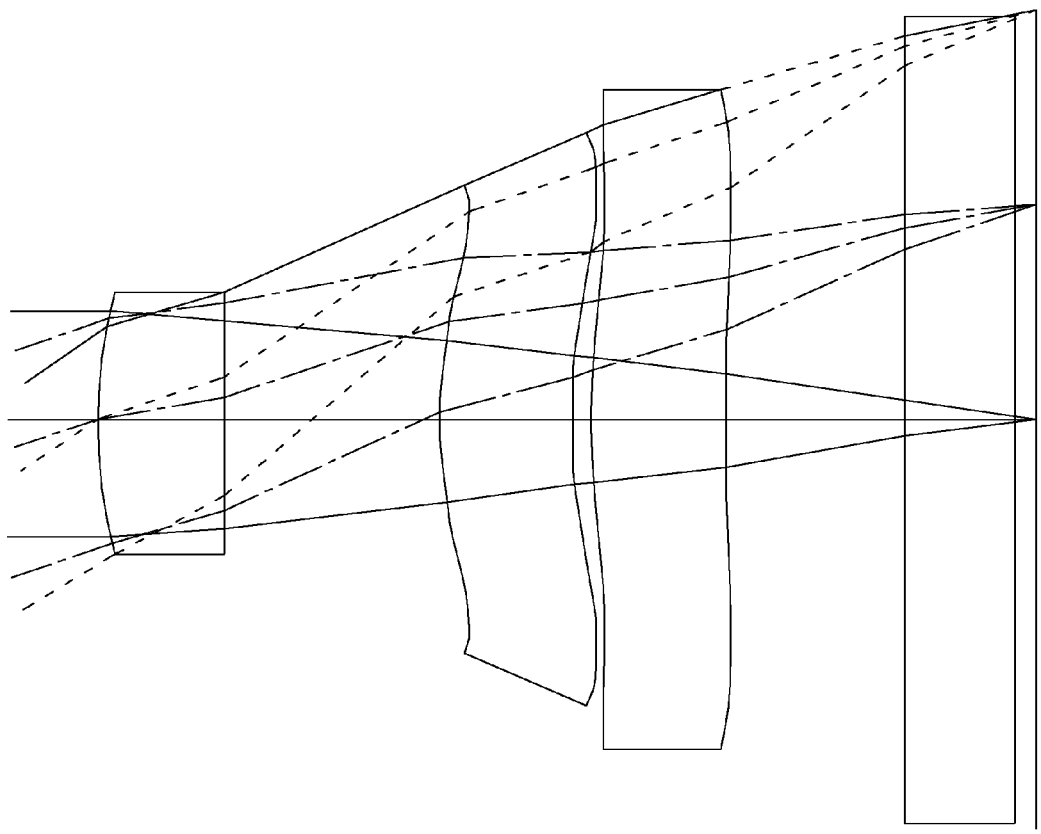
FIG. 12 is a schematic view showing the optical path structure of the three-piece optical pickup lens of the present invention according to a third embodiment thereof.
Figure 13:
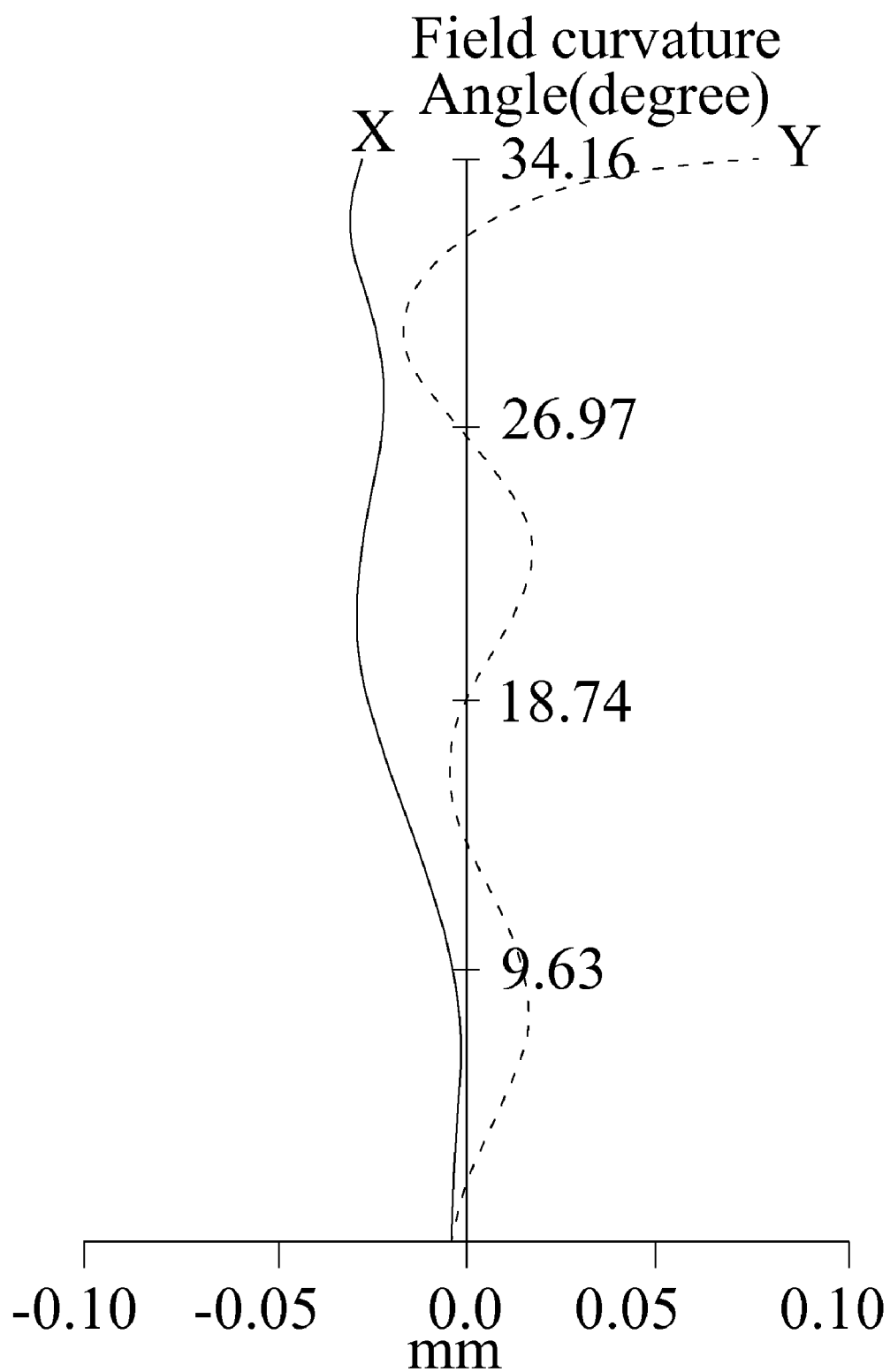
FIG. 13 is a field curvature diagram of the three-piece optical pickup lens of the present invention according to the third embodiment thereof.
Figure 14:
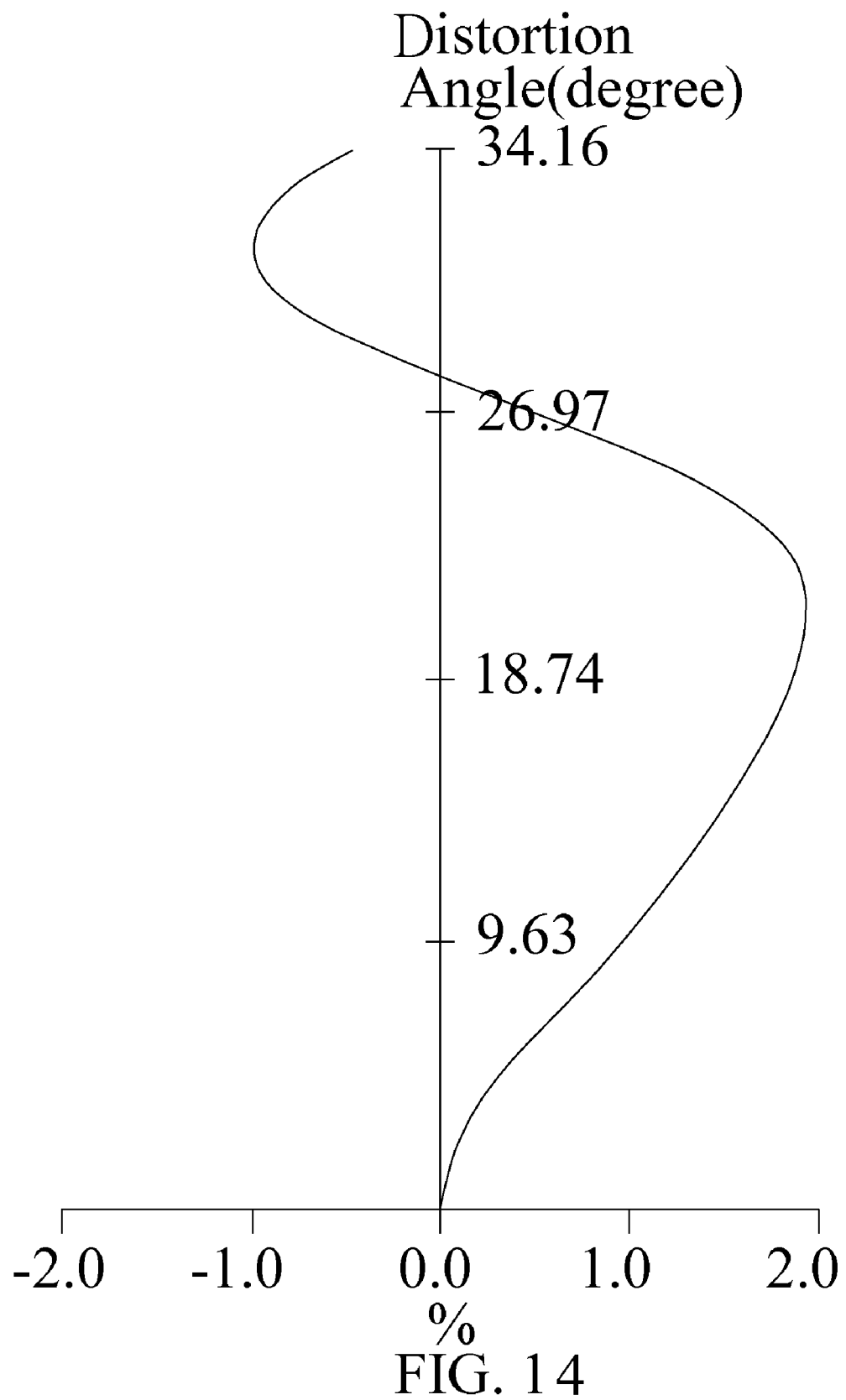
FIG. 14 is a distortion diagram of the three-piece optical pickup lens of the present invention according to the third embodiment thereof.

FIG. 12 is a schematic view showing the optical path structure of the three-piece optical pickup lens 1 according to a third embodiment of the present invention; FIG. 13 is a field curvature diagram of the three-piece optical pickup lens 1 in the third embodiment; and FIG. 14 is a distortion diagram of the three-piece optical pickup lens 1 in the third embodiment.

In the Table (7) listed below, there are shown sequentially numbered optical surfaces from the object side to the image side of the optical pickup lens 1; the radius of curvature R of each of these optical surfaces on the optical axis Z in mm; the on-axis surface spacing d between the adjacent optical surfaces on the optical axis Z; the refractive index $N_d$ of each of the lenses; the Abbe's number $v_d$ of each the lenses; and the effective focal length f, the maximum field of view FOV (2ω in degree), and the f number $F_{no}$ of the three-piece optical pickup lens 1.

TABLE 7

Fno = 2.8 f = 1.8278 FOV = 68.0

| Optical surface | Radius of curvature R | Spacing d (mm) | Refractive index $N_d$ | Abbe's number $v_d$ |
|---|---|---|---|---|
| 1 Object (OBJ) | | ∞ | | |
| STOP | | 0.0000 | | |
| 2 $R_1$* | 1.2686 | 0.3424 | 1.53 | 55.93 |
| 3 $R_2$* | 5.7386 | 0.6044 | | |
| 4 $R_3$* | 1.5350 | 0.3588 | 1.61 | 26.00 |
| 5 $R_4$* | 1.9499 | 0.0528 | | |
| 6 $R_5$* | 2.1719 | 0.3756 | 1.53 | 55.93 |
| 7 $R_6$* | 9.6487 | 0.5000 | | |
| 8 IR/CG | ∞ | 0.3000 | | |
| 9 | | 0.0588 | | |
| 10 Image (IMA) | ∞ | | | |

*Aspheric surface

In the Table (8) listed below, there are shown the coefficients for the aspheric surface formula (9) of the optical surfaces in the third embodiment:

TABLE 8

| Optical surface | k | A4 | A6 | A8 | A10 | A12 |
|---|---|---|---|---|---|---|
| $R_1$* | −3.3505E+00 | −3.0474E−02 | −6.5718E−02 | −2.4207E+00 | 3.0268E+00 | −3.7875E+00 |
| $R_2$* | −1.6094E+02 | −2.1529E−01 | −8.9321E−01 | −4.2918E−01 | 7.4353E+00 | −4.2233E+00 |
| $R_3$* | −2.0605E−01 | −1.4495E−01 | −3.4381E−01 | −3.1570E−01 | 1.8906E−01 | −3.1588E−01 |
| $R_4$* | −3.2089E−01 | −1.8893E−01 | −5.3370E−02 | −1.9140E−01 | −1.8722E−01 | −3.7526E−03 |
| $R_5$* | −2.8997E+01 | −2.5482E−01 | 1.6041E−01 | 2.6426E−02 | 1.6093E−02 | 6.0037E−03 |
| $R_6$* | 1.3366E+01 | −3.1981E−02 | −7.0705E−02 | −6.7375E−03 | 7.3300E−03 | 3.7386E−03 |

Figure 4:
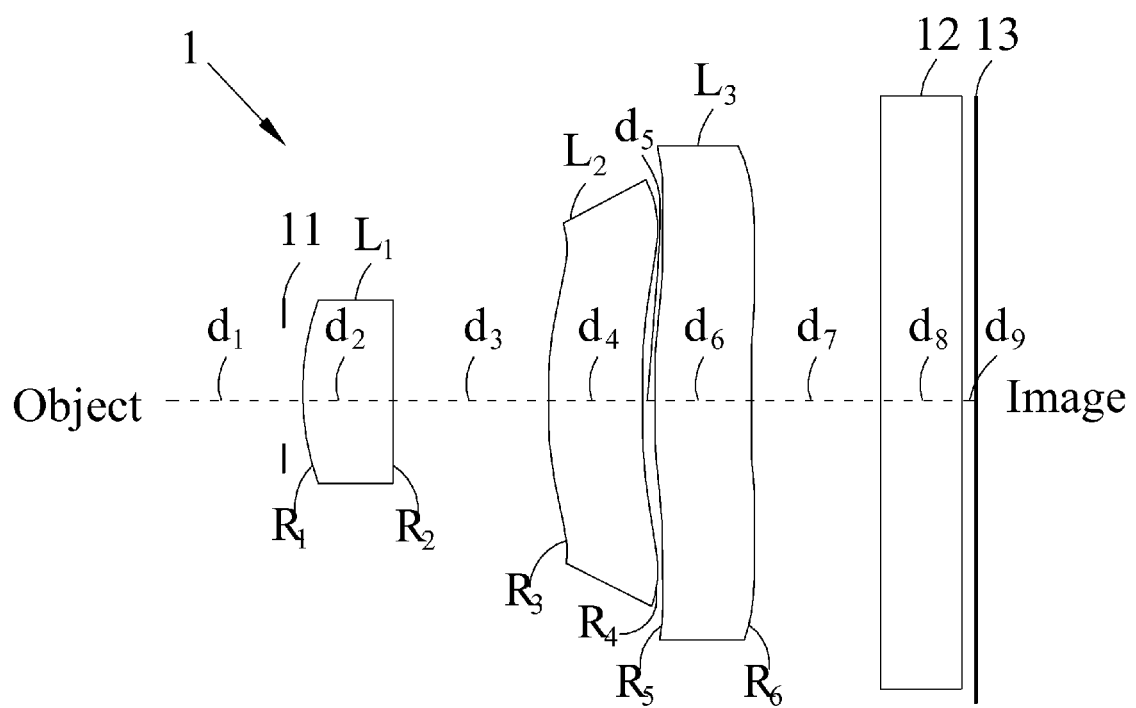
FIG. 4 is a schematic view showing another optical structure for the three-piece optical pickup lens according to the present invention.

Please refer to FIGS. 12 to 14 along with FIGS. 4 to 5. In the third embodiment, the first lens $L_1$ is made of a plastic material having a refractive index $N_{d1}$ of 1.53 and an Abbe's number $v_{d1}$ of 55.93; the second lens $L_2$ is made of a plastic material having a refractive index $N_{d2}$ of 1.61 and an Abbe's number $v_{d2}$ of 26; the third lens $L_3$ is made of a plastic material having a refractive index $N_{d3}$ of 1.53 and an Abbe's number $v_{d3}$ of 55.93; and the IR/CG 12 is made of a BK7 glass material.

In the third embodiment of the three-piece optical pickup lens 1, the effective focal length f is 1.8278 mm, the back focal length BFL is 0.8588 mm, and the TL is 2.5928 mm The focal length $f_1$ of the first lens $L_1$ is 3.0074 mm, the focal length $f_2$ of the second lens $L_2$ is 8.7398 mm, and the focal length $f_3$ of the third lens $L_3$ is 5.2221 mm The $H_{2+}$ and the $H_{2f}$ of the image side $R_4$ of the second lens $L_2$ are 1.30 mm and 1.68 mm, respectively. The $H_{3+}$ and the $H_{3f}$ of the image side $R_6$ of the third lens $L_3$ are 1.20 mm and 1.95 mm, respectively.

After calculation, the values of the formulas (1)~(2) and (4)~(8) obtained from the third embodiment of the three-piece optical pickup lens 1 are shown in the following Table (9). As can be seen from Table (9), the three-piece optical pickup lens 1 in the third embodiment thereof satisfies the conditions defined by the formulas (1)~(2) and (4)~(8).

TABLE 9

| | |
|---|---|
| BFL/TL | 0.3312 |
| 2ω | 68.0 |
| $H_{2+}/H_{2f}$ | 0.775 |
| $H_{3+}/H_{3f}$ | 0.617 |
| $f_1/f$ | 1.6454 |

TABLE 9-continued

| | |
|---|---|
| $f_2/f$ | 4.7816 |
| $f_3/f$ | 2.8570 |

<Fourth Embodiment>

Figure 15:
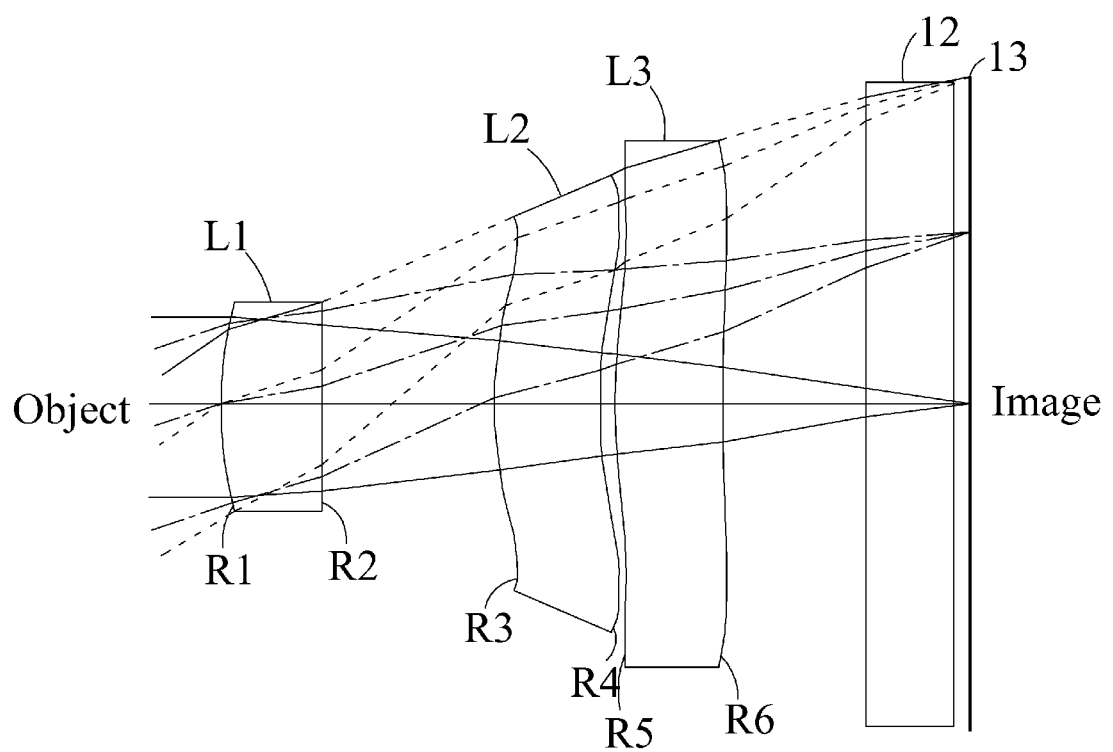
FIG. 15 is a schematic view showing the optical path structure of the three-piece optical pickup lens of the present invention according to a fourth embodiment thereof.
Figure 16:
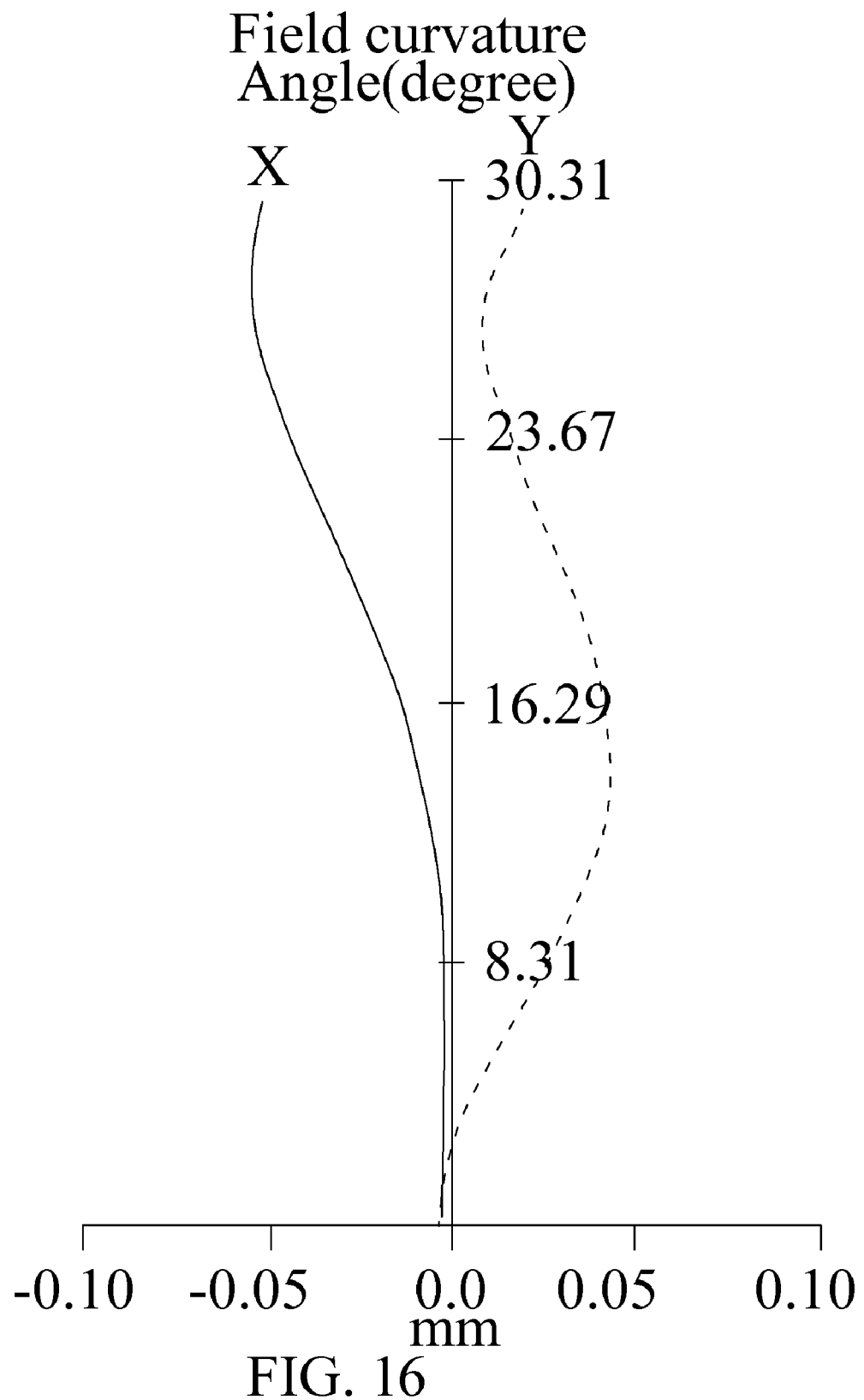
FIG. 16 is a field curvature diagram of the three-piece optical pickup lens of the present invention according to the fourth embodiment thereof.
Figure 17:
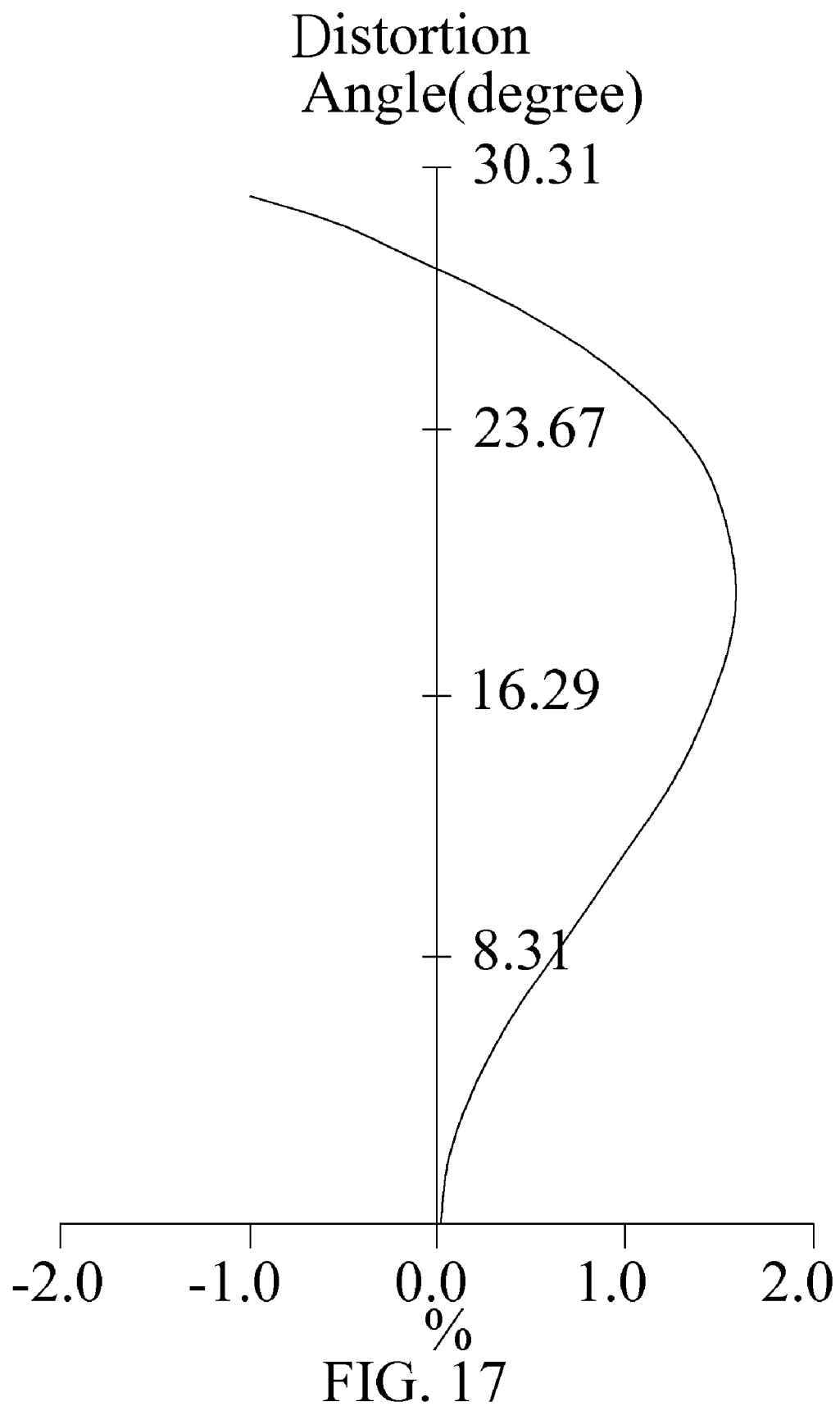
FIG. 17 is a distortion diagram of the three-piece optical pickup lens of the present invention according to the fourth embodiment thereof.

FIG. 15 is a schematic view showing the optical path structure of the three-piece optical pickup lens 1 according to a fourth embodiment of the present invention; FIG. 16 is a field curvature diagram of the three-piece optical pickup lens 1 in the fourth embodiment; and FIG. 17 is a distortion diagram of the three-piece optical pickup lens 1 in the fourth embodiment.

In the Table (10) listed below, there are shown sequentially numbered optical surfaces from the object side to the image side of the optical pickup lens 1; the radius of curvature R of each of these optical surfaces on the optical axis Z in mm; the on-axis surface spacing d between the adjacent optical surfaces on the optical axis Z; the refractive index $N_d$ of each of the lenses; the Abbe's number $v_d$ of each the lenses; and the effective focal length f, the maximum field of view FOV (2ω in degree), and the f number $F_{no}$ of the three-piece optical pickup lens 1.

TABLE 10

Fno = 2.8 f = 1.8794 FOV = 60.6

| Optical surface | Radius of curvature R | Spacing d (mm) | Refractive index $N_d$ | Abbe's number $v_d$ |
|---|---|---|---|---|
| 1 Object (OBJ) | ∞ | | | |
| STOP | | 0.0000 | | |
| 2 $R_1$* | 1.2923 | 0.3436 | 1.53 | 55.93 |
| 3 $R_2$* | 6.1716 | 0.6105 | | |
| 4 $R_3$* | 1.4709 | 0.3527 | 1.61 | 26.00 |
| 5 $R_4$* | 1.6812 | 0.0581 | | |
| 6 $R_5$* | 2.3758 | 0.4214 | 1.53 | 55.93 |
| 7 $R_6$* | 28.6181 | 0.5000 | | |
| 8 IR/CG | ∞ | 0.3000 | | |
| 9 | | 0.0588 | | |
| 10 Image (IMA) | ∞ | | | |

*Aspheric surface

In the Table (11) listed below, there are shown the coefficients for the aspheric surface formula (9) of the optical surfaces in the fourth embodiment:

TABLE 11

| Optical surface | k | A4 | A6 | A8 | A10 | A12 |
|---|---|---|---|---|---|---|
| $R_1$* | −3.5067E+00 | −3.7818E−02 | −9.0675E−02 | −2.5981E+00 | 3.5942E+00 | −3.7875E+00 |
| $R_2$* | −2.2057E+02 | −2.2972E−01 | −8.7809E−01 | −1.5477E−01 | 4.6148E+00 | −4.2233E+00 |
| $R_3$* | −1.9691E−01 | −1.3735E−01 | −4.2187E−01 | −2.8456E−01 | 4.3571E−01 | −2.3183E−01 |
| $R_4$* | −2.0960E−01 | −1.8669E−01 | −5.5770E−02 | −1.9847E−01 | −1.8280E−01 | 2.2850E−02 |
| $R_5$* | −4.1665E+01 | −2.4208E−01 | 1.6604E−01 | 3.4584E−02 | 2.6418E−02 | 2.0608E−02 |
| $R_6$* | −3.1774E+01 | −3.2289E−02 | −8.0285E−02 | 4.3785E−03 | 2.0176E−02 | 1.0421E−02 |

Please refer to FIGS. 15 to 17 along with FIGS. 4 to 5. In the fourth embodiment, the first lens $L_1$ is made of a plastic material having a refractive index $N_{d1}$ of 1.53 and an Abbe's number $v_{d1}$ of 55.93; the second lens $L_2$ is made of a plastic material having a refractive index $N_{d2}$ of 1.61 and an Abbe's number $v_{d2}$ of 26; the third lens $L_3$ is made of a plastic material having a refractive index $N_{d3}$ of 1.53 and an Abbe's number $v_{d3}$ of 55.93; and the IR/CG 12 is made of a BK7 glass material.

In the fourth embodiment of the three-piece optical pickup lens 1, the effective focal length f is 1.8794 mm, the back focal length BFL is 0.8588 mm, and the TL is 2.6450 mm The focal length $f_1$ of the first lens $L_1$ is 3.0246 mm, the focal length $f_2$ of the second lens $L_2$ is 11.5513 mm, and the focal length $f_3$ of the third lens $L_3$ is 4.8838 mm The $H_{2+}$ and the $H_{2f}$ of the image side $R_4$ of the second lens $L_2$ are 1.40 mm and 1.50 mm, respectively. The $H_{3+}$ and the $H_{3f}$ of the image side $R_6$ of the third lens $L_3$ are 1.12 mm and 1.70 mm, respectively.

After calculation, the values of the formulas (1)~(2) and (4)~(8) obtained from the fourth embodiment of the three-piece optical pickup lens 1 are shown in the following Table (12). As can be seen from Table (12), the three-piece optical pickup lens 1 in the third embodiment thereof satisfies the conditions defined by the formulas (1)~(2) and (4)~(8).

TABLE 12

| | |
|---|---|
| BFL/TL | 0.3247 |
| 2ω | 60.6 |
| $H_{2+}/H_{2t}$ | 0.935 |
| $H_{3+}/H_{3t}$ | 0.659 |
| $f_1/f$ | 1.6093 |
| $f_2/f$ | 6.1463 |
| $f_3/f$ | 2.5986 |

From the above-mentioned tables and figures, it can be found the three-piece optical pickup lens 1 of the present invention according to the above embodiments all have a back focal length BFL=0.8588 mm and a maximum field of view 2ω ranged between 60.7° and 70°. Thus, it is proven the three-piece optical pickup lens 1 of the present invention has effectively shortened back focal length and widened field of view.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A three-piece optical pickup lens comprising, sequentially from an object side to an image side of the three-piece optical pickup lens along an optical axis thereof:
   an aperture stop;
   a first lens being a meniscus lens of positive refractive power;
   a second lens having an object side and an image side; and the object side and the image side respectively having at least one inflection point located at a position between a center and a periphery of the second lens; and
   a third lens having an object side and an image side and having positive refractive power at paraxial region of optical axis; and the object side and the image side respectively having at least one inflection point located at a position between a center and a periphery of the third lens;
   wherein the three-piece optical pickup lens satisfies the following condition:

$1.21 \leq f_1/f \leq 1.66$ $-2.40 \leq f_2/f \leq 6.34$ $0.81 \leq f_3/f \leq 2.95$ where,
   f is an effective focal length of the three-piece optical pickup lens;
   $f_1$ is an effective focal length of the first lens;
   $f_2$ is an effective focal length of the second lens; and
   $f_3$ is an effective focal length of the third lens.

2. The three-piece optical pickup lens as claimed in claim 1, wherein the three-piece optical pickup lens satisfies the following condition:

$0.29 \leq BFL/TL \leq 0.36$ where,
   BFL is a back focal length of the three-piece optical pickup lens; and
   TL is a distance from the aperture stop to an object side of an image sensing chip along the optical axis.

3. The three-piece optical pickup lens as claimed in claim 1, wherein the three-piece optical pickup lens satisfies the following condition:

$59.0° \leq 2\omega \leq 72.0°$ where,
   2ω is a maximum field of view of the three-piece optical pickup lens.

4. The three-piece optical pickup lens as claimed in claim 1, wherein the second lens has negative refractive power at the center thereof at paraxial region of optical axis, and the refractive power of the second lens gradually increases from the center toward the periphery of the second lens to become positive refractive power.

5. The three-piece optical pickup lens as claimed in claim 4, wherein the second lens satisfies the following condition:

$0.700 \leq H_{2-}/H_{2t} \leq 0.995$ where,
   $H_{2-}$ is a length of a line extended normal to the optical axis between an interface point, at where the refractive power of the second lens changes from negative into positive, and an intersection of the line with the optical axis; and
   $H_{2t}$ is a length of a line extended normal to the optical axis between a maximum optically active point on the image side of the second lens and an intersection of the line with the optical axis.

6. The three-piece optical pickup lens as claimed in claim 1, wherein the second lens has positive refractive power at the center of paraxial region of optical axis, and the refractive power of the second lens gradually decreases from the center toward the periphery of the second lens to become negative refractive power.

7. The three-piece optical pickup lens as claimed in claim 6, wherein the second lens satisfies the following condition:

$0.755 \leq H_{2+}/H_{2t} \leq 0.955$ where,
   $H_{2+}$ is a length of a line extended normal to the optical axis between an interface point, at where the refractive power of the second lens changes from positive into negative, and an intersection of the line with the optical axis; and
   $H_{2t}$ is a length of a line extended normal to the optical axis between a maximum optically active point on the image side of the second lens and an intersection of the line with the optical axis.

8. The three-piece optical pickup lens as claimed in claim 1, wherein the three-piece optical pickup lens satisfies the following condition:

$0.590 \leq H_{3+}/H_{3t} \leq 0.790$ where,
   $H_{3+}$ is a length of a line extended normal to the optical axis between the inflection point on the image side of the third lens and an intersection of the line with the optical axis; and
   $H_{3t}$ is a length of a line extended normal to the optical axis between a maximum optically active point on the image side of the third lens and an intersection of the line with the optical axis.

9. The three-piece optical pickup lens as claimed in claim 1, wherein at least one of the object side and the image side of the first lens is an aspheric surface.

10. The three-piece optical pickup lens as claimed in claim 1, wherein the first lens, the second lens, and the third lens are made of a plastic material.

11. The three-piece optical pickup lens as claimed in claim 1, wherein the first lens, the second lens, and the third lens are made of a glass material.

* * * * *